US012808703B2

(12) United States Patent
Donovan et al.

(10) Patent No.: US 12,808,703 B2
(45) Date of Patent: Nov. 24, 2026

(54) SYSTEMS AND METHODS FOR DETECTING WATER HAZARD CONDITIONS PROXIMATE TO A STRUCTURE

(71) Applicant: STATE FARM MUTUAL AUTOMOBILE INSURANCE COMPANY, Bloomington, IL (US)

(72) Inventors: John R. Donovan, Bloomington, IL (US); Joseph Robert Brannan, Bloomington, IL (US); Aaron Williams, Congerville, IL (US); Jeffrey Wilson Stoiber, Atlanta, GA (US); Bryan R. Nussbaum, Bloomington, IL (US); Ellakate LeFebre, Mesa, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 420 days.

(21) Appl. No.: 18/459,334

(22) Filed: Aug. 31, 2023

(65) Prior Publication Data

US 2024/0167864 A1 May 23, 2024

Related U.S. Application Data

(60) Provisional application No. 63/426,423, filed on Nov. 18, 2022.

(51) Int. Cl.

*G01F 23/00* (2022.01)
*B64U 10/00* (2023.01)
(Continued)

(52) U.S. Cl.

CPC .......... *G01F 23/0007* (2013.01); *G06F 3/011* (2013.01); *G06F 3/04815* (2013.01);
(Continued)

(58) Field of Classification Search

CPC ... G01F 23/0007; G01F 23/804; G06T 19/00; G06T 2200/04; G06T 2210/04;
(Continued)

(56) References Cited

U.S. PATENT DOCUMENTS 7,458,782 B1 * 12/2008 Spadola, Jr. ............ F04B 49/02 417/36
9,505,494 B1 * 11/2016 Marlow ............... G05D 1/0011
(Continued)

OTHER PUBLICATIONS

Wu et al., CN 113464197 A, "Mine Water Damage Emergency Management Method and System", Date Published: Oct. 1, 2021 (Year: 2021).*

*Primary Examiner* — John H Le
(74) *Attorney, Agent, or Firm* — MARSHALL, GERSTEIN & BORUN LLP

(57) ABSTRACT

Techniques for detecting water hazard conditions proximate to a structure are disclosed herein. An exemplary computer-implemented method may include receiving, from a sensor disposed proximate to the structure, a water level signal, and determining a water level proximate to the structure based upon the water level signal. The exemplary computer-implemented method may further include detecting, by executing a water hazard model, a water hazard condition based upon the water level proximate to the structure, and determining (i) a recommended mitigation action to mitigate damage to the structure from the water hazard condition and (ii) a cause of the water hazard condition. The exemplary computer-implemented method may further include generating an alert signal indicating the water hazard condition and the recommended mitigation action.

20 Claims, 13 Drawing Sheets

(51) Int. Cl.
*B64U 101/00* (2023.01)
*G06F 3/01* (2006.01)
*G06F 3/04815* (2022.01)
*G06T 19/00* (2011.01)

(52) U.S. Cl.
CPC .............. *G06T 19/00* (2013.01); *B64U 10/00* (2023.01); *B64U 2101/00* (2023.01); *G06T 2200/04* (2013.01); *G06T 2210/04* (2013.01); *G06T 2210/64* (2013.01)

(58) Field of Classification Search
CPC .. G06T 2210/64; G06F 3/011; G06F 3/04815; G01S 13/88; B64U 2101/00
USPC ........................................................... 702/55
See application file for complete search history.

(56) References Cited

U.S. PATENT DOCUMENTS

| | | | | |
|---|---|---|---|---|
| 11,107,025 | B2 * | 8/2021 | Sun | G06F 30/10 |
| 11,436,777 | B1 * | 9/2022 | Karli | G06V 20/13 |
| 2020/0209092 | A1 * | 7/2020 | Banta | F04B 49/08 |

* cited by examiner

SYSTEMS AND METHODS FOR DETECTING WATER HAZARD CONDITIONS PROXIMATE TO A STRUCTURE

CROSS-REFERENCE TO RELATED APPLICATION

This application claims priority to U.S. Provisional Patent Application No. 63/426,423, entitled "Systems and Methods for Detecting Water Hazard Conditions Proximate to a Structure," filed on Nov. 18, 2022, the disclosure of which is hereby incorporated herein by reference.

TECHNICAL FIELD

The present disclosure generally relates to systems and methods for monitoring water levels, and more particularly, to detecting water hazard conditions proximate to a structure and generating alert signals indicating the conditions and recommended mitigation actions.

BACKGROUND

Generally speaking, home owners and property owners may be responsible for the maintenance, repair, and overall upkeep of their respective structures. As part of that responsibility, such owners may typically determine when and how to perform maintenance, but may conventionally lack sufficient knowledge about when and how that maintenance should be performed. Many issues that may result in catastrophic damage, such as leaking/cracked pipes, a damaged foundation, insufficient drainage, a poorly maintained sump pump, and many others may go unnoticed for months/years.

Conventional techniques may completely lack the capability to inform property owners about such issues. Namely, conventional techniques may involve an owner manually inspecting areas of the structure and devices within the structure for damage or other issues that may require maintenance/repair. Other conventional techniques may include a maintenance service provider contacting a home owner when regular maintenance for portions of the owner's structure or devices therein are scheduled for maintenance within the service provider's system. However, in either case, portions of the owner's structure or devices that are not included in the inspection/maintenance services provided by the maintenance service provider, and/or randomly inspected by the owner themselves, may remain completely unexamined for months/years. As a result, these conventional techniques frequently overlook portions of an owner's structure or devices that may desperately require maintenance or repair, such that the owner's structure/devices may experience catastrophic effects (e.g., bursting pipes, major structural damage from fractured foundation, etc.) leading to exorbitantly expensive and/or irreparable damage.

These issues with conventional techniques are further compounded in circumstances where the owner's structure is subjected to extreme weather conditions that may cause months/years-worth of damage or wear in relatively short periods (e.g., minutes, hours, days). For example, hurricanes bring massive storm surges and high winds that may easily flood and/or otherwise damage poorly maintained structures or devices therein. In situations where a catastrophic event (e.g., hurricane, tornado, blizzard, snow or ice storm, etc.) is approaching and an owner has not maintained their structure, the owner's life may also be in danger because the structure may lack the necessary robustness to avoid catastrophic damage from the event.

Therefore, in general, proper maintenance, repair, and overall upkeep of a structure and the systems/devices proximate to the structure is an area of great interest, and conventional techniques are insufficient for providing such proper upkeep. Conventional techniques may also include additional ineffectiveness, inefficiencies, encumbrances, and/or other drawbacks.

SUMMARY

Generally, the present embodiments may relate to, inter alia, systems and methods for detecting water hazard conditions proximate to a structure and providing property owners with (i) accurate, up-to-date information about potential hazardous conditions, and (ii) recommendations for mitigating any damaging effects. For instance, the present embodiments may relate to monitoring water level signals from sensors disposed proximate to a structure to detect water hazard conditions. From these detected water hazard conditions, the systems and methods of the present disclosure may determine recommended mitigation actions that may help a user/property owner (collectively referenced herein as "users" or a "user") mitigate damage to their structure as a result of (i) the water hazard condition, and/or (ii) a cause of the water hazard condition. In this manner, the systems and methods of the present disclosure may enable property owners to proactively mitigate and/or avoid damage from hazardous water conditions (e.g., floods, burst pipes) while simultaneously enabling the property owner to take steps to fix and/or otherwise maintain the problem area of the structure that may be the cause of the damage.

For example, the systems and methods of the present disclosure may include ground water sensors and/or other sensors that detect and analyze water levels rising around a structure (e.g., a residential house). In some embodiments, the systems and methods of the present disclosure may include collectively analyzing sensors and ground water data/tables to create a crowdsourced map and/or other baseline representations of water conditions in an area/neighborhood that is completely anonymous. These aggregated resources may provide generic information as a storm is going through to enable users to take preventative and/or corrective actions that mitigate or resolve issues associated with water leaks. Namely, with such a crowdsourcing approach, the systems and methods of the present disclosure may provide users an advance warning/alert as a storm or other catastrophic event is approaching, and allow them to prepare and get items/valuables off the floor in the basement, ground floors, etc. In certain embodiments, the system may analyze Doppler radar from a weather application, and may determine how quickly a storm system is moving through the neighborhood that includes the structure or surrounding neighborhoods/regions/zones.

Moreover, the systems and methods of the present disclosure may enable a user to see communities, or zones within communities, that receive more water, more ground saturation overall, and/or ones that have more water damage claims in a particular area. This information may also be used to underwrite or model water/flood insurance policies based upon the zones within the community at any suitable level (e.g., community, neighborhoods, states, countries, etc.). In certain embodiments, this analysis may also be performed for non-catastrophe water losses based upon houses that were built by the same contractor, that are in a same area that experiences substantial subsidence, or the like. Further, this analysis may also be correlated to a soil-type monitor or soil assessment that is attached to underwriting the structure.

In some embodiments, the systems and methods of the present disclosure may also provide structural recommendations based upon geolocation data and/or other neighborhood trends collected by the sensors. In particular, the sensors included in an individual structure may also correlate data with other sensors of the structure to enable the system to identify flow points where the user may benefit from suggestions to re-direct water away from pooling locations. For example, the systems and methods of the present disclosure may identify that many structures in a particular neighborhood utilize French drains to alleviate pressures from heavy rainfall.

As another example, the sensors may perform a three-dimensional (3D) scan of the surrounding ground to identify ground slopes and to make a determination of how to modify the ground in a manner that alleviates heavy water flow concerns. In some embodiments, drones may capture 3D images that provide an individualized visualization of a yard or surrounding ground of a structure. In certain embodiments, a user may wear a VR (virtual reality or other) headset to determine where rain will flow, and the systems and methods of the present disclosure may provide gutter recommendations or other mitigating actions.

In some embodiments, a water sensor in a basement may generate and/or transmit alerts to a homeowner related to whether or not there is a leak in the basement. In some embodiments, the systems and methods of the present disclosure may include community or individual house water sensors to determine if there is individual fault involved (e.g., of homeowner, contractor, etc.), or if the cause of any damage is primarily due to environmental factors (e.g., flooding, hurricanes, heavy rain or snow, catastrophic water event).

One exemplary embodiment of the present disclosure may be a computer-implemented method for detecting water hazard conditions proximate to a structure. The computer-implemented method may be implemented via one or more local or remote processors, servers, sensors, transceivers, memory units, mobile devices, wearables, smart glasses, smart watches, augmented reality glasses, virtual reality headset, mixed or extended reality glasses or headsets, and/or other electronic or electrical components, which may be in wired or wireless communication with one another. In one instance, the method may include (1) receiving, from a sensor disposed proximate to the structure, a water level signal; (2) determining, by one or more processors, a water level proximate to the structure based upon the water level signal; (3) detecting, by the one or more processors executing a water hazard model, a water hazard condition based upon the water level proximate to the structure; (4) determining, by the one or more processors, (i) a recommended mitigation action to mitigate damage to the structure from the water hazard condition and/or (ii) a cause of the water hazard condition; and/or (5) generating, by the one or more processors, an alert signal indicating the water hazard condition and the recommended mitigation action. The method may include additional, less, or alternate actions and functionality, including that discussed elsewhere herein.

For instance, in a variation of this embodiment, the sensor may be one of a plurality of sensors disposed proximate to a plurality of structures, and receiving the water level signal further may include: (i) aggregating, by the one or more processors, water level signals from the plurality of sensors; (ii) creating, by the one or more processors, a regional water level map that represents water level conditions in a region including the structure; and/or (iii) causing, by the one or more processors, the regional water level map to be displayed to a user. Further in this variation, the computer-implemented method may further include: (a) retrieving, by the one or more processors, radar data representing weather conditions within the region including the structure; (b) determining, by the one or more processors, a predicted water level at a first time based upon the radar data and the water level signals from the plurality of sensors; and/or (c) generating, by the one or more processors, a predicted alert signal indicating (i) the predicted water level at the first time, and/or (ii) a predicted mitigation action.

In another variation of this embodiment, the computer-implemented method may further include: (1) retrieving, by the one or more processors, historical water level data for a plurality of regions including the region that includes the structure, the historical water level data including at least one of: (i) water level values, (ii) ground saturation values, (iii) water damage claim values, and/or (iv) soil-type values; (2) determining, by the one or more processors, one or more zones within the plurality of regions based upon the historical water level data; and/or (3) causing, by the one or more processors, the one or more zones to be displayed to a user. Further in this variation, determining the cause of the damage to the structure may further include: (i) retrieving, by the one or more processors, contractor data corresponding to structures within the plurality of regions; and/or (ii) determining, by the one or more processors, the cause of the damage to the structure based upon the contractor data and the historical water level data.

In yet another variation of this embodiment, the computer-implemented method may further include: (1) retrieving, by the one or more processors, geolocation data corresponding to the structure; (2) determining, by the one or more processors, a structural recommendation based upon the geolocation data and the water hazard condition; and/or (3) causing, by the one or more processors, the structural recommendation to be displayed to a user. Further in this variation, the sensor disposed proximate to the structure may be configured to generate a three-dimensional (3D) scan of ground proximate to the structure, and the method further may include: (i) receiving, from the sensor, the 3D scan of the ground proximate to the structure; (ii) identifying, by the one or more processors, ground slopes of the ground proximate to the structure; and/or (iii) determining, by the one or more processors, a recommended modification to the ground proximate to the structure based upon the ground slopes and the water hazard condition. Still further in this variation, the sensor may be disposed in an unmanned aerial vehicle (UAV), such as a drone, configured to fly over the structure.

In still another variation of this embodiment, the computer-implemented method may further include: (i) generating, by the one or more processors, a virtual reality (VR) representation of ground proximate to the structure; and/or (ii) causing, by the one or more processors, one or more recommendations to be displayed to a user in the VR representation.

Another exemplary embodiment of the present disclosure may be a computer system for detecting water hazard conditions proximate to a structure. The computer system may include one or more local or remote processors, servers, sensors, transceivers, memory units, mobile devices, wearables, smart glasses, smart watches, augmented reality glasses, virtual reality headset, mixed or extended reality glasses or headsets, and/or other electronic or electrical components, which may be wired or wireless communication with one another. In one instance, the system may include: one or more processors; and a non-transitory computer-readable memory coupled to the one or more processors. The memory may store instructions thereon that, when executed by the one or more processors, cause the one or more processors to: (1) receive, from a sensor disposed proximate to the structure, a water level signal; (2) determine a water level proximate to the structure based upon the water level signal; (3) detect, by executing a water hazard model, a water hazard condition based upon the water level proximate to the structure; (4) determine (i) a recommended mitigation action to mitigate damage to the structure from the water hazard condition, and/or (ii) a cause of the water hazard condition; and/or (5) generate an alert signal indicating the water hazard condition and the recommended mitigation action. The system may include additional, less, or alternate functionality, including that disclosed elsewhere herein.

For instance, in a variation of this embodiment, the sensor may be one of a plurality of sensors disposed proximate to a plurality of structures, and the instructions, when executed, further cause the one or more processors to receive the water level signal by: (i) aggregating water level signals from the plurality of sensors; (ii) creating a regional water level map that represents water level conditions in a region including the structure; and/or (iii) causing the regional water level map to be displayed to a user. Further in this variation, the instructions, when executed, may further cause the one or more processors to: (i) retrieve radar data representing weather conditions within the region including the structure; (ii) determine a predicted water level at a first time based upon the radar data and the water level signals from the plurality of sensors; and/or (iii) generate a predicted alert signal indicating (a) the predicted water level at the first time, and (b) a predicted mitigation action.

In another variation of this embodiment, the instructions, when executed, may further cause the one or more processors to: (1) retrieve historical water level data for a plurality of regions including the region that includes the structure, the historical water level data including at least one of: (i) water level values, (ii) ground saturation values, (iii) water damage claim values, and/or (iv) soil-type values; (2) determine one or more zones within the plurality of regions based upon the historical water level data; and/or (3) cause the one or more zones to be displayed to a user.

In yet another variation of this embodiment, the instructions, when executed, may further cause the one or more processors to determine the cause of the damage to the structure by: (1) retrieving contractor data corresponding to structures within the plurality of regions; and/or (2) determine the cause of the damage to the structure based upon the contractor data and the historical water level data.

In still another variation of this embodiment, the instructions, when executed, may further cause the one or more processors to: (1) retrieve geolocation data corresponding to the structure; (2) determine a structural recommendation based upon the geolocation data and the water hazard condition; and/or (3) cause the structural recommendation to be displayed to a user. Further in this variation, the sensor disposed proximate to the structure is configured to generate a three-dimensional (3D) scan of ground proximate to the structure, and the instructions, when executed, further cause the one or more processors to: (1) receive, from the sensor, the 3D scan of the ground proximate to the structure; (2) identify ground slopes of the ground proximate to the structure; and/or (3) determine a recommended modification to the ground proximate to the structure based upon the ground slopes and the water hazard condition.

Yet another exemplary embodiment of the present disclosure may be a tangible machine-readable medium comprising instructions for detecting water hazard conditions proximate to a structure that, when executed, cause a machine to at least: (1) receive, from a sensor disposed proximate to the structure, a water level signal; (2) determine a water level proximate to the structure based upon the water level signal; (3) detect, by executing a water hazard model, a water hazard condition based upon the water level proximate to the structure; (4) determine (i) a recommended mitigation action to mitigate damage to the structure from the water hazard condition, and/or (ii) a cause of the water hazard condition; and/or (5) generate an alert signal indicating the water hazard condition and the recommended mitigation action. The instructions may direct additional, less, or alternate functionality, including that discussed elsewhere herein.

For instance, in a variation of this embodiment, the sensor may be one of a plurality of sensors disposed proximate to a plurality of structures, and the instructions, when executed, further cause the machine to receive the water level signal by: (a) aggregating water level signals from the plurality of sensors; (b) creating a regional water level map that represents water level conditions in a region including the structure; and/or (c) causing the regional water level map to be displayed to a user. Further in this variation, the instructions, when executed, may further cause the machine to at least: (1) retrieve radar data representing weather conditions within the region including the structure; (2) determine a predicted water level at a first time based upon the radar data and the water level signals from the plurality of sensors; and/or (3) generate a predicted alert signal indicating (i) the predicted water level at the first time, and/or (ii) a predicted mitigation action.

In another variation of this embodiment, the instructions, when executed, may further cause the machine to at least: (1) retrieve historical water level data for a plurality of regions including the region that includes the structure, the historical water level data including at least one of: (i) water level values, (ii) ground saturation values, (iii) water damage claim values, and/or (iv) soil-type values; (2) determine one or more zones within the plurality of regions based upon the historical water level data; and/or (3) cause the one or more zones to be displayed to a user.

In accordance with the above, and with the disclosure herein, the present disclosure includes improvements in computer functionality or in improvements to other technologies at least because the disclosure describes that, e.g., a hosting server (e.g., central server), or otherwise computing device (e.g., a user computing device), is improved where the intelligence or predictive ability of the hosting server or computing device is enhanced by a trained water hazard model, device health model, emergency condition model, and mapping model. These models, executing on the hosting server or user computing device, are able to accurately and efficiently determine mitigation actions and causes of damage, determine recommended usage adjustments for devices associated with a structure, detect emergency conditions and generate remediation alert signals, and/or generate regional maps based upon environmental data, contractor data, and/or geolocation data. That is, the present disclosure describes improvements in the functioning of the computer itself or "any other technology or technical field" because a hosting server or user computing device, is enhanced with various models to accurately predict, detect, determine, and generate user/owner-specific conditions and recommendations configured to improve the respective user/owner's maintenance and emergency preparedness efforts related to a structure and associated devices. This improves over the prior art at least because existing systems lack such predictive or classification functionality, and are simply not capable of accurately analyzing such data on a real-time basis to output predictive and/or otherwise recommended results designed to improve a user/owner's overall upkeep and emergency preparedness efforts related to a structure and associated devices.

In certain instances, these models may be trained using machine learning, and may utilize machine learning during operation. Therefore, in these instances, the techniques of the present disclosure may further include improvements in computer functionality or in improvements to other technologies at least because the disclosure describes such models being trained with a plurality of training data (e.g., 10,000s of training water level signal data, usage data, sensor data, environmental data, contractor data, geolocation data) to output the user/owner-specific conditions and recommendations configured to improve the respective user/owner's maintenance and emergency preparedness efforts related to a structure and associated devices.

Moreover, the present disclosure includes effecting a transformation or reduction of a particular article to a different state or thing, e.g., transforming or reducing the maintenance and general upkeep of a structure from a non-optimal or error state to an optimal state.

Still further, the present disclosure includes specific features other than what is well-understood, routine, conventional activity in the field, or adding unconventional steps that demonstrate, in various embodiments, particular useful applications, e.g., (1) detecting, by the one or more processors, a water hazard condition based upon the water level proximate to the structure; (2) determining, by the one or more processors, (i) a recommended mitigation action to mitigate damage to the structure from the water hazard condition and (ii) a cause of the water hazard condition; and/or (3) generating, by the one or more processors, an alert signal indicating the water hazard condition and the recommended mitigation action.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Exemplary Computing System

Figure 1:
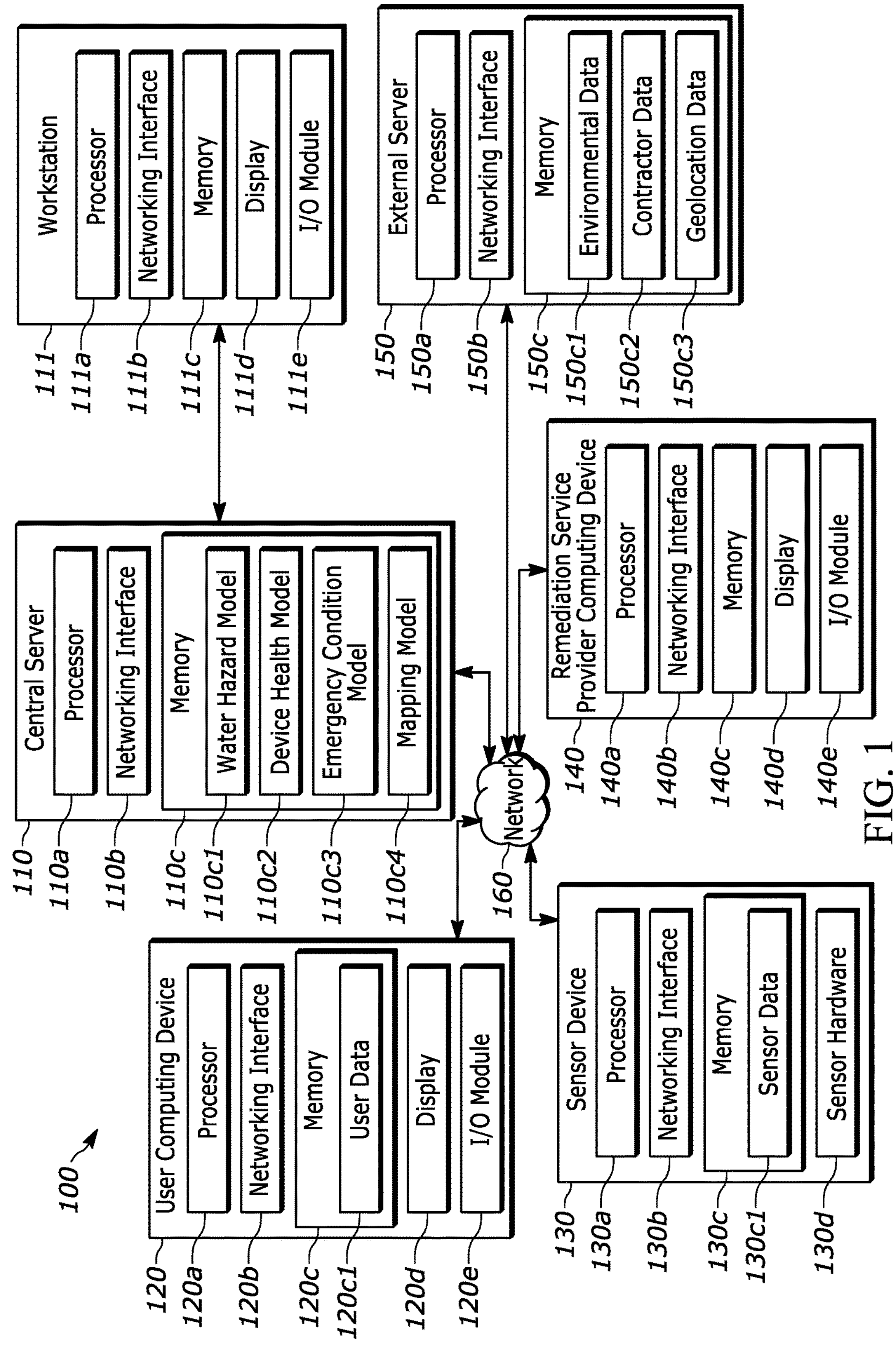
FIG. 1 depicts an exemplary computing system in which various embodiments of the present disclosure may be implemented.

FIG. 1 depicts an exemplary computing system 100 in which various embodiments of the present disclosure may be implemented. Depending on the embodiment, the exemplary computing system 100 may calculate/determine a recommended mitigation action, a recommended usage adjustment, a remediation alert signal, a water hazard condition, a regional water level map, an alert signal, a predicted water level, a predicted alert signal, a set of regional zones, a cause of damage to a structure, a structural recommendation, a virtual reality (VR) representation, an estimated maintenance value, a regional usage map, a proposed policy term adjustment, a damage mitigation recommendation, a preventative action signal, a remediation action signal, an evacuation recommendation, an emergency condition alert, and/or any other values or combinations thereof. Of course, it should be appreciated that, while the various components of the exemplary computing system 100 (e.g., central server 110, user computing device 120, sensor device 130, etc.) are illustrated in FIG. 1 as single components, the exemplary computing system 100 may include multiple (e.g., dozens, hundreds, thousands) of each of the components that are simultaneously connected to the network 160 at any given time.

Generally speaking, the exemplary computing system 100 may include a central server 110, a workstation 111, a user computing device 120, a sensor device 130, a remediation service provider computing device 140, and an external server 150. The central server 110 may generally receive data corresponding to one or more structures (e.g., from sensor device 130), and may process the data in accordance with one or more sets of instructions contained in the memory 110*c* to output any of the values previously described. The central server 110 may include one or more processors 110*a*, a networking interface 110*b*, and a memory 110*c*. The memory 110*c* may include various sets of executable instructions that are configured to analyze data received at the central server 110 and analyze that data to output various values. These executable instructions include, for example, a water hazard model 110*c*1, a device health model 110*c*2, an emergency condition model 110*c*3, and a mapping model 110*c*4.

More specifically, the central server 110 may be configured to receive and/or otherwise access data from various devices (e.g., sensor device 130), and may utilize the processor(s) 110*a* to execute the instructions stored in the memory 110*c* to analyze and/or otherwise process the received data. As an example, the central server 110 may receive water level signals from the sensor device 130 in circumstances where the sensor device 130 is disposed proximate to a structure (not shown). The water level signals may indicate a water level proximate to the structure, as measured and/or otherwise sensed by the sensor device 130. Accordingly, the central server 110 may utilize the processor(s) 110*a* to execute the water hazard model 110*c*1 stored in the memory 110*c* to detect a water hazard condition based upon a water level proximate to the structure that is indicated and/or otherwise represented by the water level signals.

As another example, the central server 110 may receive usage data from the sensor device 130 in circumstances where the sensor device 130 is disposed proximate to and/or otherwise coupled with a device (not shown) associated with a structure. The usage data may include electrical consumption data of the device, and may otherwise generally indicate an amount, degree, and/or type of usage of the device over time, as measured and/or otherwise sensed by the sensor device 130. Accordingly, the central server 110 may utilize the processor(s) 110*a* to execute the device health model 110*c*2 stored in the memory 110*c* to determine a health status of the device based upon a usage level that is indicated and/or otherwise represented by the usage data.

As yet another example, the central server 110 may receive data from the sensor device 130 in circumstances where the sensor device 130 is disposed proximate to a structure, disposed proximate to and/or otherwise coupled with a device, and/or otherwise generating/recording data that is associated with a structure/device. The data received from the sensor device 130 may represent significant deviation(s) from normal operating conditions within or otherwise associated with the structure/device, such that the central server 110 may utilize the processor(s) 110*a* to execute the emergency condition model 110*c*3 stored in the memory 110*c*. The emergency condition model 110*c*3 may detect an emergency condition (e.g., burst pipe flooding a structure basement) within the structure/device, and may also determine a set of remediation services (e.g., offered by a service provider utilizing the remediation service provider computing device 140) that may be integral to remediating damage caused as a result of the emergency condition.

As still another example, the central server 110 may aggregate water level data, usage data, or emergency condition data from a plurality of sensor devices in a plurality of locations (e.g., represented collectively in this example by sensor device 130) and/or historical sets of such data for the plurality of locations to develop a visual mapping corresponding to the data for display to users that may want a broader perspective of issues associated with such data. Accordingly, the central server 110 may utilize the processor(s) 110*a* to execute the mapping model 110*c*4 stored in the memory 110*c* to create a regional water level map, regional zones representative of historical water level data, a regional device usage map, and/or any other suitable maps or combinations thereof.

In order to execute these or other instructions stored in memory 110*c*, the central server 110 may communicate with a workstation 111. The workstation 111 may generally be any computing device that is communicatively coupled with the central server 110, and more particularly, may be a computing device with administrative permissions that enable a user accessing the workstation 111 to update and/or otherwise change data/models/applications that are stored in the memory 110*c*. For example, the workstation 111 may enable a user to access the central server 110, and the user may train the models 110*c*1-*c*4 that are stored in the memory 110*c*. As discussed herein, in certain embodiments, one or more of the models 110*c*1-*c*4 may be trained by and may implement machine learning (ML) techniques. In these embodiments, the user accessing the workstation 111 may upload training data, execute training sequences to train the models 110*c*1-*c*4, and may update/re-train the models 110*c*1-*c*4 over time. The workstation 111 may include one or more processors 111*a*, a networking interface 111*b*, a memory 111*c*, a display 111*d*, and an input/output (I/O) module 111*e*.

In some embodiments, the central server 110 may store and execute instructions that may generally train the various models 110*c*1-*c*4 stored in the memory 110*c*. For example, the central server 110 may execute instructions that are configured to train the water hazard model 110*c*1 to output the detected water hazard condition, train the device health model 110*c*2 to output the health status of a device, train the emergency condition model 110*c*3 to output the detected emergency condition and/or set of remediation services, and/or train the mapping model 110*c*4 to output the regional water level map, regional zones representative of historical water level data, and/or regional device usage map using training dataset(s).

In particular, the training dataset(s) may include a plurality of training water level signals/data and a plurality of training water hazard conditions, a plurality of training usage data and a plurality of training health statuses, a plurality of training sensor data and training emergency conditions and/or a plurality of training sets of remediation services, a plurality of training aggregate sensor/historical data and a plurality of maps, and/or any other suitable data and combinations thereof. In certain embodiments, any of the water hazard model 110*c*1, the device health model 110*c*2, the emergency condition model 110*c*3, and/or the mapping model 110*c*4 may be a rules-based algorithm configured to receive water level signals/data, usage data, sensor data, aggregated sensor data and/or historical sensor data as input and to output a water hazard condition, a health status, an emergency condition and set of remediation services, and/or respective maps.

However, in some aspects, the central server 110 may utilize one or more machine learning (ML) techniques to train the water hazard model 110*c*1, the device health model 110*c*2, the emergency condition model 110*c*3, and/or the mapping model 110*c*4 as a ML model. The water hazard model 110*c*1, the device health model 110*c*2, the emergency condition model 110*c*3, and/or the mapping model 110*c*4 may be trained using a training dataset that includes a plurality of training water level signals/data and a plurality of training water hazard conditions, a plurality of training usage data and a plurality of training health statuses, a plurality of training sensor data and training emergency conditions and/or a plurality of training sets of remediation services, a plurality of training aggregate sensor/historical data and a plurality of maps, and/or any other suitable data and combinations thereof.

The water hazard model 110*c*1 may use the training dataset to (during execution using real-time data) output a detected water hazard condition based upon a water level proximate to a structure, and/or to output a recommended mitigation action or cause of the damage to the structure. The device health model 110*c*2 may use the training dataset to (during execution using real-time data) output a health status of a device based upon a usage level of the device, and/or to output a recommended usage adjustment for the device. The emergency condition model 110*c*3 may use the training dataset to (during execution using real-time data) output a detected emergency condition within a structure, and/or to output a set of remediation services corresponding to the structure based upon the emergency condition. The mapping model 110*c*4 may use the training dataset to (during execution using real-time data) output a regional water level map, regional zones representative of historical water level data, a regional device usage map, and/or other suitable maps.

Generally speaking, ML techniques have been developed that allow parametric or nonparametric statistical analysis of large quantities of data. Such ML techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. More specifically, a processor or a processing element may be trained using supervised or unsupervised ML.

In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based upon the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Exemplary ML programs/algorithms that may be utilized by the central server 110 to train the water hazard model 110*c*1, the device health model 110*c*2, the emergency condition model 110*c*3, and/or the mapping model 110*c*4 and/or by the water hazard model 110*c*1, the device health model 110*c*2, the emergency condition model 110*c*3, and/or the mapping model 110*c*4 may include, without limitation: neural networks (NN) (e.g., convolutional neural networks (CNN), deep learning neural networks (DNN), combined learning module or program), linear regression, logistic regression, decision trees, support vector machines (SVM), naïve Bayes algorithms, k-nearest neighbor (KNN) algorithms, random forest algorithms, gradient boosting algorithms, Bayesian program learning (BPL), voice recognition and synthesis algorithms, image or object recognition, optical character recognition (OCR), natural language understanding (NLU), and/or other ML programs/algorithms either individually or in combination.

After training, ML programs (or information generated by such ML programs) may be used to evaluate additional data. Such data may be and/or may be related to sensor data, environmental data 150*c*1, contractor data 150*c*2, geolocation data 150*c*3, and/or other data that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. The disclosures herein may use one or more of such supervised and/or unsupervised ML techniques. Further, it should be appreciated that, as previously mentioned, the water hazard model 110*c*1, the device health model 110*c*2, the emergency condition model 110*c*3, and/or the mapping model 110*c*4 may be used to output a water hazard condition, a health status, an emergency condition and set of remediation services, and/or respective maps, using artificial intelligence (e.g., a ML model of the water hazard model 110*c*1, the device health model 110*c*2, the emergency condition model 110*c*3, and/or the mapping model 110*c*4) or, in alternative aspects, without using artificial intelligence.

Moreover, although the methods described elsewhere herein may not directly mention ML techniques, such methods may be read to include such ML for any determination or processing of data that may be accomplished using such techniques. In some aspects, such ML techniques may be implemented automatically upon occurrence of certain events or upon certain conditions being met. In any event, use of ML techniques, as described herein, may begin with training a ML program, or such techniques may begin with a previously trained ML program.

When the water hazard model 110*c*1 determines the water hazard condition, the recommended mitigation action, and/or the cause of the damage to the structure, the central server

110 may generate an alert signal that indicates the water hazard condition, the recommended mitigation action, and/or the cause of the damage to the structure. For example, the water hazard model 110*c*1 may determine that the ground floor level of a structure is experiencing flooding near the front door of the structure which may cause damage to the front door, flooring, and any proximate objects (e.g., furniture), a recommended mitigation action of pumping flood water out of the structure to mitigate any such damage, and may also determine that the likely cause of the water hazard condition is a lack of drainage near the exterior of the front door or a poorly sealed front doorframe. In this example, the central server 110 may generate an alert signal that indicates the flooding near the front door, the recommendation to pump flood water out of the structure, and/or the lack of drainage or poor doorframe seal as the likely cause of the flooding.

The central server 110 may then transmit the alert signal to the user computing device 120 for display to a user. Moreover, in certain embodiments, the central server 110 may also transmit the alert signal to the remediation service provider computing device 140 to initiate potential communication between the remediation service provider and the user. Such potential communication may be or include a phone call, web chat, email, text message, or other communication medium initiated by the central server 110, and/or the central server 110 may provide contact information to both the user and the remediation service provider.

When the device health model 110*c*2 determines the health status and/or the recommended usage adjustment, the central server 110 may cause the recommended usage adjustment and/or the health status to be displayed for a user (e.g., via user computing device 120). For example, the device health model 110*c*2 may determine that a sump pump within a structure is drawing a level of current that exceeds the normal operating conditions (e.g., a threshold current draw) for such a sump pump, and the model 110*c*2 may further generate a recommended usage adjustment indicating that the user should run their sump pump less frequently to avoid overuse and schedule more regular maintenance/repair to avoid excess sump pump degradation. In this example, the central server 110 may generate an alert signal that indicates the excessive current draw of the sump pump, and may also provide the recommended usage adjustment.

The central server 110 may then transmit the alert signal to the user computing device 120 for display to a user. Moreover, in certain embodiments, the central server 110 may also transmit the alert signal to the remediation service provider computing device 140 to initiate potential communication between the remediation service provider and the user. Such potential communication may be or include a phone call, web chat, email, text message, or other communication medium initiated by the central server 110, and/or the central server 110 may provide contact information to both the user and the remediation service provider.

When the emergency condition model 110*c*3 detects the emergency condition and/or determines the set of remediation service, the central server 110 may generate a remediation alert signal that indicates the emergency condition, the set of remediation services, and/or contact information corresponding to at least one remediation service provider. For example, the emergency condition model 110*c*3 may detect that a water pipe has burst in the basement of a structure and is flooding the basement, and may determine that flooding remediation services may be required. In this example, the central server 110 may generate a remediation alert signal that indicates the flooding in the basement, the recommended flooding remediation services, and/or contact information corresponding to a flooding remediation service provider.

The central server 110 may then transmit the remediation alert signal to the user computing device 120 for display to a user. Moreover, in certain embodiments, the central server 110 may also transmit the remediation alert signal to the remediation service provider computing device 140 to initiate potential communication between the remediation service provider and the user. Such potential communication may be or include a phone call, web chat, email, text message, or other communication medium initiated by the central server 110, and/or the central server 110 may provide contact information to both the user and the remediation service provider.

When the mapping model 110*c*4 determines a respective map (e.g., a regional water level map), the central server 110 may cause the respective map to be displayed to a user via the user computing device 120. For example, the mapping model 110*c*4 may create a regional water level map that represents water level conditions in a region that includes a structure based upon water level signals from a plurality of sensors that are disposed proximate to a plurality of structures in this region. In this example, the central server 110 may then transmit the regional water level map to the user computing device 120 for display to a user as part of a graphical user interface (GUI) displayed on the display 120*d*, and as discussed herein.

Regardless, the central server 110 may transmit the outputs of any of these models 110*c*1-*c*4 or other instructions executed by the processor(s) 110*a* to the user computing device 120 that is operated by a user associated with a structure/device. The user may then view the user computing device 120 to determine how to proceed with maintenance, repair, mitigation, remediation, evacuation, and/or other actions/recommendations indicated in the data/alerts transmitted by the central server 110. For example, the central server 110 may transmit an alert to the user computing device 120 indicating that a catastrophic event is approaching the user's structure. The user may view this alert on the user computing device 120, and may proceed with emergency preparedness measures corresponding to the catastrophic event (e.g., boarding windows/doors, stockpiling water, insulating pipes, etc.). Thereafter, the user may also determine that evacuating in advance of the catastrophic event reaching the structure is advantageous, and the user may utilize evacuation routes and safe areas indicated in the alert displayed on the user computing device 120 to reach a safe distance from the catastrophic event.

More generally, the user computing device 120 may be associated with (e.g., in the possession of, configured to provide secure access to, etc.) a particular user, who may be associated with a structure (e.g., homeowner) or device. The user computing device 120 may be a personal computing device of that user, such as a smartphone, a tablet, smart glasses, or any other suitable device or combination of devices (e.g., a smart watch plus a smartphone) with wireless communication capability. In the embodiment of FIG. 1, the user computing device 120 may include a processor 120*a*, a networking interface 120*b*, a memory 120*c*, a display 120*d*, and a I/O module 120*e*. The memory 120*c* may also include user data 120*c*1 that may be or include any suitable data, such as structures/devices associated with the user, maintenance histories of the user's structures/devices, and/or any other suitable data or combinations thereof.

The user computing device 120 may be communicatively coupled to the central server 110, the sensor device 130, the remediation service provider computing device 140, and/or the external server 150. For example, the user computing device 120 and the central server 110, the sensor device 130, the remediation service provider computing device 140, and/or the external server 150 may communicate via USB, Bluetooth, Wi-Fi Direct, Near Field Communication (NFC), etc. For example, the central server 110 may transmit a water hazard condition, a health status, an emergency condition and set of remediation services, respective maps, and/or alerts to the user computing device 120 via the networking interface 110*b*, which the user computing device 120 may receive via the networking interface 120*b*.

Further, the user computing device 120 may obtain data corresponding to a structure or device that may be uploaded to the central server 110 for analysis by one or more of the models 110*c*1-*c*4 and/or other instructions stored in the memory 110*c*. For example, a user may take a photograph of a structure and/or a device or input information corresponding to the structure and/or device into the user computing device 120, and the user computing device 120 may transmit the photograph or other information to the central server 110 to analyze the data (e.g., via a CNN, machine vision algorithms, natural language understanding algorithms, and/or other suitable algorithms). The central server 110 may then generate a communication that includes the results of the data analysis, and may transmit the communication to the user computing device 120 via the networking interface 110*b*.

The sensor device 130 may generally be or include any suitable type of sensor that may measure, generate, record, and/or otherwise sense some physically observable quality of a structure and/or a device. For example, the sensor device 130 may be a sound sensor, an imaging device (e.g., infrared camera, time of flight camera, visual camera, etc.), a vibration sensor, a ground water level sensor, a thermometer, an accelerometer, a gyroscope, a humidity sensor, a pressure sensor, and/or any other suitable sensor or combinations thereof. Further, the sensor device 130 may be disposed in any suitable location, such as in topsoil or just below the surface of a yard, physically coupled to a pipe, drain, sink, toilet, gutter, unmanned aerial vehicle (UAV), etc., and/or in any other suitable location where the sensor device 130 may be suitably positioned to measure, generate, record, and/or otherwise sense the physically observable quality of the corresponding structure and/or device.

The remediation service provider computing device 140 may be associated with (e.g., in the possession of, configured to provide secure access to, etc.) a particular remediation service provider employee, who may communicate with a user through the user computing device 120 and/or the central server 110 to schedule remediation services corresponding to the user's structure/device. The remediation service provider computing device 140 may be a company computing device issued to that employee and/or otherwise utilized by employees of the remediation service provider, such as a smartphone, a tablet, smart glasses, or any other suitable device or combination of devices (e.g., a smart watch plus a smartphone) with wireless communication capability. In the embodiment of FIG. 1, the remediation service provider computing device 140 may include a processor 140*a*, a networking interface 140*b*, a memory 140*c*, a display 140*d*, and a I/O module 140*e*.

The external server 150 may be or include computing servers and/or combinations of multiple servers storing data that may be accessed/retrieved by the central server 110, the user computing device 120, and/or the remediation service provider computing device 140. The data stored by the external server 150 may include environmental data 150*c*1, contractor data 150*c*2, and/or geolocation data 150*c*3. Generally speaking, each of the environmental data 150*c*1, the contractor data 150*c*2, and/or the geolocation data 150*c*3 may be accessed, retrieved, and/or otherwise received by the central server 110, and may be utilized by the models 110*c*1-*c*4 to generate the outputs of those models 110*c*1-*c*4. The external server 150 may include a processor 150*a*, a networking interface 150*b*, and a memory 150*c* that includes the environmental data 150*c*1, the contractor data 150*c*2, and the geolocation data 150*c*3.

The environmental data 150*c*1 may include data corresponding to weather and/or other meteorological conditions in regions which the central server 110 may include, for example, when utilizing the mapping model 110*c*4 to output respective maps. Each region described and/or otherwise indicated in the environmental data 150*c*1 may be a country, a state, a province, a county, a parish, a city, a town, etc., and/or a sub-region therein or any suitable area. In particular, the environmental data 150*c*1 may include, without limitation, radar data for each region, historical water level data for each region, and/or other data corresponding to each region.

The contractor data 150*c*2 may include data corresponding to contractor information and/or other construction/maintenance information for structures/devices in regions which the central server 110 may include, for example, when utilizing the mapping model 110*c*4 to output respective maps. Each region described and/or otherwise indicated in the contractor data 150*c*2 may be a country, a state, a province, a county, a parish, a city, a town, etc., and/or a sub-region therein or any suitable area. In particular, the contractor data 150*c*2 may include, without limitation, contractors that built/maintained structures in each region, service providers that built/maintained devices in each region, maintenance/repair values for each region, historical usage data for each region, and/or other data corresponding to each region.

The geolocation data 150*c*3 may include data corresponding to structural modifications/adjustments, ground slopes, and/or other geographical or structural data in regions which the central server 110 may include, for example, when utilizing the mapping model 110*c*4 to output respective maps. Each region described and/or otherwise indicated in the geolocation data 150*c*3 may be a country, a state, a province, a county, a parish, a city, a town, etc., and/or a sub-region therein or any suitable area. In particular, the geolocation data 150*c*3 may include, without limitation, catastrophic event data for each region, topographic data for each region, structural modifications/adjustment data for each region, and/or other data corresponding to each region.

Each of the processors 110*a*, 111*a*, 120*a*, 130*a*, 140*a*, 150*a* may include any suitable number of processors and/or processor types. For example, the processors 110*a*, 111*a*, 120*a*, 130*a*, 140*a*, 150*a* may include one or more CPUs and one or more graphics processing units (GPUs). Generally, each of the processors 110*a*, 111*a*, 120*a*, 130*a*, 140*a*, 150*a* may be configured to execute software instructions stored in each of the corresponding memories 110*c*, 111*c*, 120*c*, 130*c*, 140*c*, 150*c*. The memories 110*c*, 111*c*, 120*c*, 130*c*, 140*c*, 150*c* may include one or more persistent memories (e.g., a hard drive and/or solid state memory) and may store one or more applications, modules, and/or models, such as the water hazard model 110*c*1, the device health model 110*c*2, the emergency condition model 110*c*3, and the mapping model 110*c*4.

The networking interface 110*b* may enable the central server 110 to communicate with the workstation 111, the user computing device 120, the sensor device 130, the remediation service provider computing device 140, the external server 150, and/or any other suitable devices or combinations thereof. More specifically, the networking interface 110*b* enables the central server 110 to communicate with each component of the exemplary computing system 100 across the network 160 through their respective networking interfaces 110*b*, 111*b*, 120*b*, 130*b*, 140*b*, 150*b*. The networking interface 110*b* may support wired or wireless communications, such as USB, Bluetooth, Wi-Fi Direct, Near Field Communication (NFC), etc. The networking interface 110*b* may enable the central server 110 to communicate with the various components of the exemplary computing system 100 via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

It will be understood that the above disclosure is one example and does not necessarily describe every possible embodiment. As such, it will be further understood that alternate embodiments may include fewer, alternate, and/or additional steps or elements.

Exemplary Workflows for a Computing Device

Figure 2A:
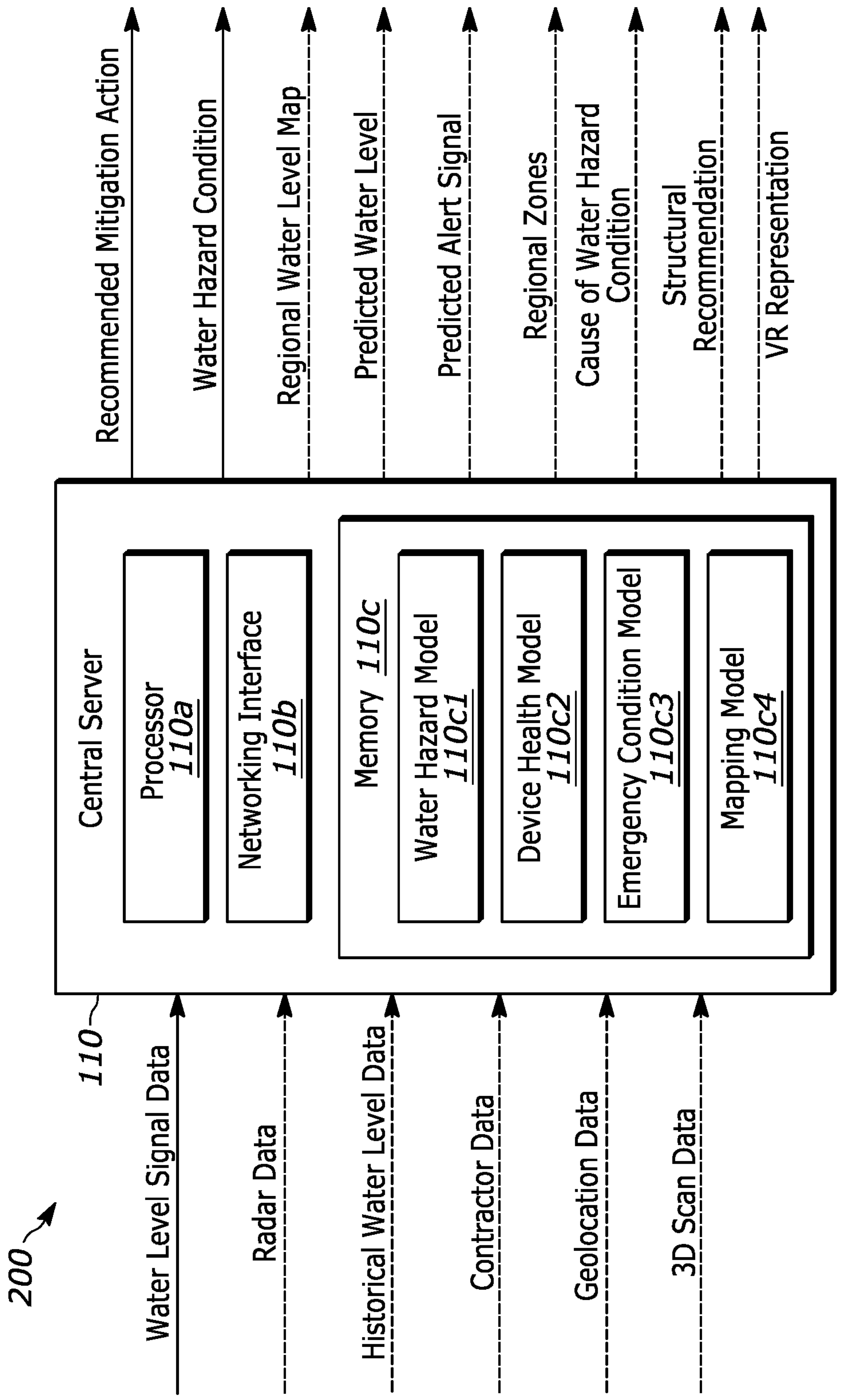
FIG. 2A depicts a first exemplary workflow for data input/output of a computing device of FIG. 1, in accordance with various embodiments described herein.

FIG. 2A, depicts a first exemplary workflow 200 for data input/output of a computing device (e.g., the central server 110) of FIG. 1, in accordance with various embodiments described herein. The first exemplary workflow 200 generally illustrates various data received/retrieved by the central server 110 that is utilized by the models 110*c*1-*c*4 as inputs to generate various outputs. The various data received/retrieved by the central server 110 includes water level signal data, radar data, historical water level data, contractor data, geolocation data, and 3D scan data. The various outputs generated by the models 110*c*1-*c*4 based upon the received/retrieved data includes a recommended mitigation action, a water hazard condition, a regional water level map, a predicted water level, a predicted alert signal, regional zones, a cause of a water hazard condition, a structural recommendation, and a VR representation.

As previously described, the water level signal data, the radar data, the historical water level data, the contractor data, the geolocation data, and/or the 3D scan data received/retrieved by the central server 110 may include a large variety of specific information/data. For example, the water level signal data may include data indicative of a current water level proximate to a structure (e.g., inside and/or outside of the structure), and/or any other suitable information or combinations thereof. The radar data may include forecasted/real-time radar data of a region surrounding and/or otherwise including the structure, and/or any other suitable data or combinations thereof. The historical water level data may include data corresponding to historical water levels of the region including the structure and/or as sensed by a particular sensor device (e.g., sensor device 130) disposed proximate to the structure. The contractor data may include data corresponding to contractor information and/or other construction/maintenance information for structures/devices in regions surrounding and including the structure. The geolocation data may include data corresponding to structural modifications/adjustments, ground slopes, and/or other geographical or structural data in regions surrounding and including the structure. The 3D scan data may include topographical data of a ground area proximate to the structure (e.g., front yard, back yard, etc.).

Using this data as input, the models 110*c*1-*c*4 and other instructions stored in memory 110*c* may determine one or more of the outputs, such as the recommended mitigation action, the water hazard condition, the regional water level map, the predicted water level, the predicted alert signal, the regional zones, the cause of the water hazard condition, the structural recommendation, and/or the VR representation. Of course, in certain instances, the central server 110 may not receive any radar data, historical water level data, contractor data, geolocation data, or 3D scan data. In these instances, the central server 110 may receive only the water level signal data corresponding to a particular structure, and may generate at least the recommended mitigation action and the water hazard condition for the particular structure.

As mentioned, the recommended mitigation action may include an action intended to mitigate damage to a structure as a result of a water hazard condition. To determine this recommended mitigation action, the central server 110 may receive from a sensor disposed proximate to the structure, the water level signal data. The central server 110 may then determine a water level proximate to the structure based on the water level signal, such as determining that the water level is one foot and eight inches above the location of the sensor disposed proximate to the structure. The central server 110 may then detect the water hazard condition based on the water level proximate to the structure by the processor(s) 110*a* executing the water hazard model 110*c*1. The central server 110 may also then determine the recommended mitigation action (e.g., pumping flood water out of the structure) to mitigate damage to the structure from the water hazard condition and the cause of the water hazard condition (e.g., damaged doorframe seals). As a result, the central server 110 may also generate and output an alert signal indicating the water hazard condition and the recommended mitigation action for transmission to a user computing device (e.g., user computing device 120) for display to a user. In certain embodiments, the water hazard condition may include a single numerical value (e.g., 1, 2, 3, etc.), a confidence interval, a percentage (e.g., 95%, 50%, etc.), an alphanumerical character(s) (e.g., A, B, C, etc.), a symbol, and/or any other suitable value or indication of a likelihood that the water hazard condition detected by the water hazard model is representative of the actual water hazard experienced at the structure.

In certain embodiments, the central server 110 may also receive and aggregate water level signals from a plurality of sensors that are disposed proximate to a plurality of structures. In these embodiments, the central server 110 may create a regional water level map that represents water level conditions in a region including the structure by the one or more processors executing the mapping model 110*c*4. The central server 110 may then output the regional water level map, and may cause the regional water level map to be displayed to a user via the user computing device 120. Further in these embodiments, the central server 110 may retrieve the radar data representing weather conditions within the region including the structure, and may determine a predicted water level at a first time based on the radar data and the water level signals from the plurality of sensors. For example, the water hazard model 110*c*1 may determine the predicted water level based upon the radar data, and the central server 110 may then generate a predicted alert signal indicating (i) the predicted water level at the first time, and/or (ii) a predicted mitigation action. The predicted mitigation action may include removing objects from basement areas that are likely to be flooded, and/or other suitable mitigation actions that may mitigate the damaging effects of the predicted water level.

In certain embodiments, the central server 110 may retrieve the historical water level data for a plurality of regions including the region that includes the structure. The historical water level data may be or include at least one of: (i) water level values, (ii) ground saturation values, (iii) water damage claim values, or (iv) soil-type values for each of the regions included in the plurality of regions. The central server 110 may then determine one or more regional zones within the plurality of regions based on the historical water level data, such that each regional zone represents an area within the plurality of regions where the historical water level data is relatively similar for structures in the regional zone. The central server 110 may then cause the one or more regional zones to be displayed to a user.

Further in these embodiments, the central server 110 may retrieve the contractor data corresponding to structures within the plurality of regions, and the central server 110 may then determine the cause of the water hazard condition based upon the contractor data and the historical water level data. For example, if a first contractor built all structures within a zone experiencing relatively high water damage claim values, then the cause of the water hazard condition may be or include faulty construction of the structure performed by the first contractor.

In some embodiments, the central server 110 may retrieve the geolocation data corresponding to the structure, and may determine the structural recommendation based upon the geolocation data and the water hazard condition. For example, the geolocation data may indicate that the structure is located in a region that experiences very cold temperatures that can result in cracking of exposed or otherwise poorly insulated pipes. In this example, the central server 110 may determine that a burst pipe water hazard condition may be the result of poorly insulated pipes, and as a result, may determine a structural recommendation to wrap all water pipes in a suggested amount of insulation to prevent future cracking/bursting. The central server 110 may then cause the structural recommendation to be displayed to a user.

Further in these embodiments, the sensor disposed proximate to the structure may be configured to generate the 3D scan data of ground proximate to the structure. In these instances, the central server 110 may also receive the 3D scan data of the ground proximate to the structure from the sensor, and the central server 110 may also identify ground slopes of the ground proximate to the structure. The central server 110 may then determine a recommended modification to the ground proximate to the structure based on the ground slopes and the water hazard condition. Still further in these embodiments, the sensor may be disposed in a UAV configured to fly over the structure and capture the 3D scan data.

In certain embodiments, the central server 110 may also utilize any of the water level signal data, the radar data, the historical water level data, the contractor data, the geolocation data, the 3D scan data, and/or other suitable data to generate a virtual reality (VR) representation of ground proximate to the structure. In these embodiments, the central server 110 may also cause one or more recommendations to be displayed to a user in the VR representation when the user views the VR representation in a VR environment, as discussed herein.

Figure 2B:
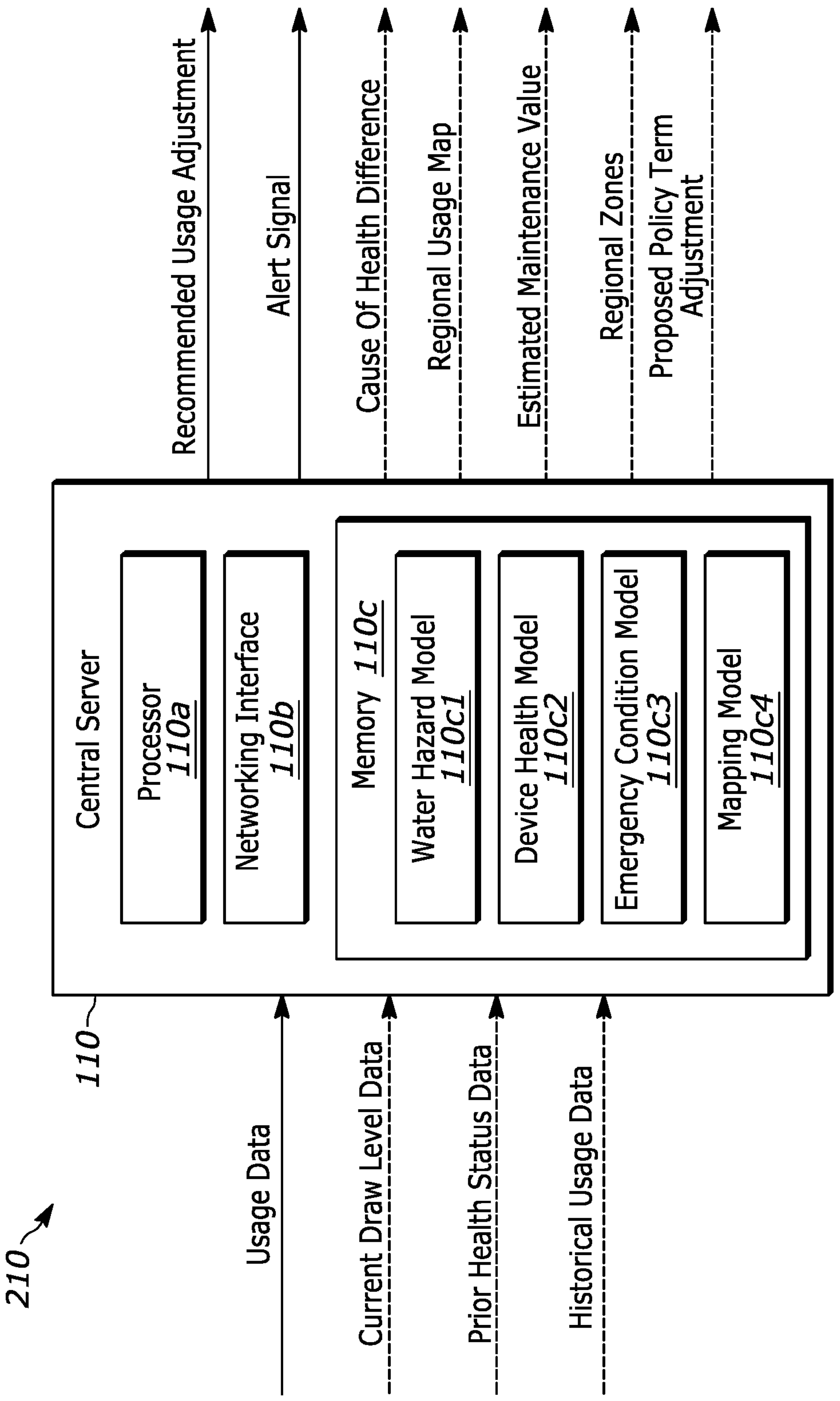
FIG. 2B depicts a second exemplary workflow for data input/output of a computing device of FIG. 1, in accordance with various embodiments described herein.

FIG. 2B, depicts a second exemplary workflow 210 for data input/output of a computing device (e.g., the central server 110) of FIG. 1, in accordance with various embodiments described herein. The second exemplary workflow 210 generally illustrates various data received/retrieved by the central server 110 that is utilized by the models 110*c*1-*c*4 as inputs to generate various outputs. The various data received/retrieved by the central server 110 includes usage data, current draw level data, prior health status data, and historical usage data. The various outputs generated by the models 110*c*1-*c*4 based upon the received/retrieved data includes a recommended usage adjustment, an alert signal, a cause of health differences, a regional usage map, an estimated maintenance value, regional zones, and a proposed policy term adjustment.

As previously described, the usage data, the current draw level data, the prior health status data, and/or the historical usage data received/retrieved by the central server 110 may include a large variety of specific information/data. For example, the usage data may include data indicative of a current usage of a device (e.g., inside and/or outside of the structure), such as electrical consumption data and/or any other suitable information or combinations thereof. The current draw level data may include a threshold current draw level for a device, and/or any other suitable data or combinations thereof. The prior health status data may include data corresponding to historical health statuses of the device, as sensed by a particular sensor device (e.g., sensor device 130) disposed proximate to the device. The historical usage data may include data corresponding to historical usage of the device over time and/or a plurality of devices in a plurality of regions, such as historical current draw levels for the device and/or a plurality of devices in a plurality of regions.

Using this data as input, the models 110*c*1-*c*4 and other instructions stored in memory 110*c* may determine one or more of the outputs, such as the recommended usage adjustment, the alert signal, the cause of health differences, the regional usage map, the estimated maintenance value, the regional zones, and/or the proposed policy term adjustment. Of course, in certain instances, the central server 110 may not receive any current draw level data, prior health status data, and/or historical usage data. In these instances, the central server 110 may receive only the usage data corresponding to a particular device, and may generate at least the recommended usage adjustment and the alert signal for the particular device. In certain embodiments, the device associated with the structure may be a sump pump and/or a water heater.

For example, using some/all of the received data, the central server 110 may determine a health or maintenance status of a device based on a neighborhood potential for how often the sump pumps typically run (e.g., as indicated in the historical usage data or aggregated usage data). Continuing this example, certain neighborhoods with older structures may not have and/or may not normally run sump pumps, whereas neighborhoods with newer structures may more consistently have sump pumps and may use them more frequently. Accordingly, the central server 110 may utilize this aggregate neighborhood (or other suitable region) usage data or historical usage data to determine how the usage data of the user's device compares to typical or regional usage data.

The central server 110 may also generally extrapolate any/all of this received data to help users, such as by considering water heater models, sump pump models, similar house constructions types/ neighborhoods, etc. that the user may want to consider as a replacement for the currently installed device. The central server 110 may then generate and output a recommended replacement device as part of the alert signal and/or the recommended usage adjustment based on the overall level of similarity of usage data collected/aggregated from structures with the currently installed device and structures with the recommended replacement devices. Of course, all of this received data may be anonymous, such that the details of devices, usage data, maintenance, and/or other information corresponding to particular users or structure may not be shared or otherwise indicated to other users.

As mentioned, the recommended usage adjustment may include an adjustment to a usage of the device that is intended to mitigate damage or wear to a device as a result of a determined health status. To determine this recommended usage adjustment, the central server 110 may receive usage data corresponding to a device associated with the structure, and the usage data may include at least electrical consumption data of the device. The central server 110 may also determine a usage level of the device based upon the usage data, and determine a health status of the device based upon the usage level by utilizing the device health model 110*c*2. The central server 110 may then generate the recommended usage adjustment for the device based upon the health status, and cause the recommended usage adjustment to be displayed to a user.

In certain embodiments, the recommended usage adjustment may include a single numerical value (e.g., 1, 2, 3, etc.), a confidence interval, a percentage (e.g., 95%, 50%, etc.), an alphanumerical character(s) (e.g., A, B, C, etc.), a symbol, and/or any other suitable value or indication of a likelihood that the usage adjustment determined by the device health model is representative of a beneficial adjustment to the usage of the device. Further, the recommended usage adjustment may include at least one of: (i) a device setting recommendation, (ii) a replacement device recommendation, (iii) a structure adjustment recommendation, and/or (iv) a location recommendation In certain embodiments, the central server 110 may determine a current draw level of the device while the device is in operation based upon the electrical consumption data of the device included as part of the usage data. The central server 110 may also compare the current draw level of the device with a threshold current draw level, and responsive to determining that the current draw level exceeds the threshold current draw level, the central server 110 may generate an alert signal indicating that the current draw level exceeds the threshold current draw level. For example, the central server 110 may determine that the current draw level of the device (2 Amps (A)) exceeds the threshold current draw level (1.5 A), such that the usage of the device should be adjusted or the device should be maintained/repaired to reduce the current draw of the device. The central server 110 may then cause the recommended usage adjustment and the alert signal to be displayed to the user.

In some embodiments, the central server 110 may determine a health difference value between the health status of the device and a prior health status of the device. The central server 110 may then compare the health difference value to a threshold health difference value, and responsive to determining that the health difference value exceeds the threshold health difference value, the central server 110 may determine the cause of the health difference value. For example, the central server 110 may determine that the health status of the device has decreased substantially over a first time period, and this substantial decrease may be attributable to overuse of the device. Consequently, the central server 110 may generate a recommended usage adjustment that indicates to a user to reduce usage of the device to preserve remaining service life. The central server 110 may then cause the recommended usage adjustment and the cause of the health difference value to be displayed to the user.

In some embodiments, the central server 110 may aggregate usage data from a plurality of devices in a plurality of structures within a region including the structure. The central server 110 may then create a regional usage map that represents the usage data in the region, and may cause the regional usage map to be displayed to the user. For example, the regional usage map may indicate usage trends or statistics for devices in each region on the regional usage map, such as average maintenance costs for similar devices. The central server 110 may also determine an estimated maintenance value corresponding to the device based upon the usage data from the plurality of devices. For example, the estimated maintenance value may indicate that maintaining the device in the user's region may be approximately $500, whereas similar maintenance in a neighboring region may cost only $300.

In certain embodiments, the central server 110 may also retrieve historical usage data for a plurality of devices in a plurality of regions including a region that includes the structure. The historical usage data may include at least electrical consumption data for the plurality of devices, and the central server 110 may determine one or more zones within the plurality of regions based upon the historical usage data. The central server 110 may then cause the one or more zones to be displayed to the user. Further in these embodiments, the central server 110 may generate the recommended usage adjustment for the device based upon the health status and the historical usage data of a zone that includes the structure.

In some embodiments, the central server 110 may generate a proposed policy term adjustment corresponding to the structure based on the health status of the device, and cause the proposed policy term adjustment to be displayed to the user. In particular, the central server 110 may analyze implications of the received data (e.g., low-use frequency of device, high-use frequency of device), and may determine a proposed policy term adjustment to account for those implications. For example, the health status of the device may indicate that the user is properly maintaining the device. As a result, the central server 110 may generate a proposed policy term adjustment that indicates an optional reduced premium payment, reduced deductible, and/or other policy term adjustments that reflect the user's beneficial maintenance habits corresponding to the device.

Figure 2C:
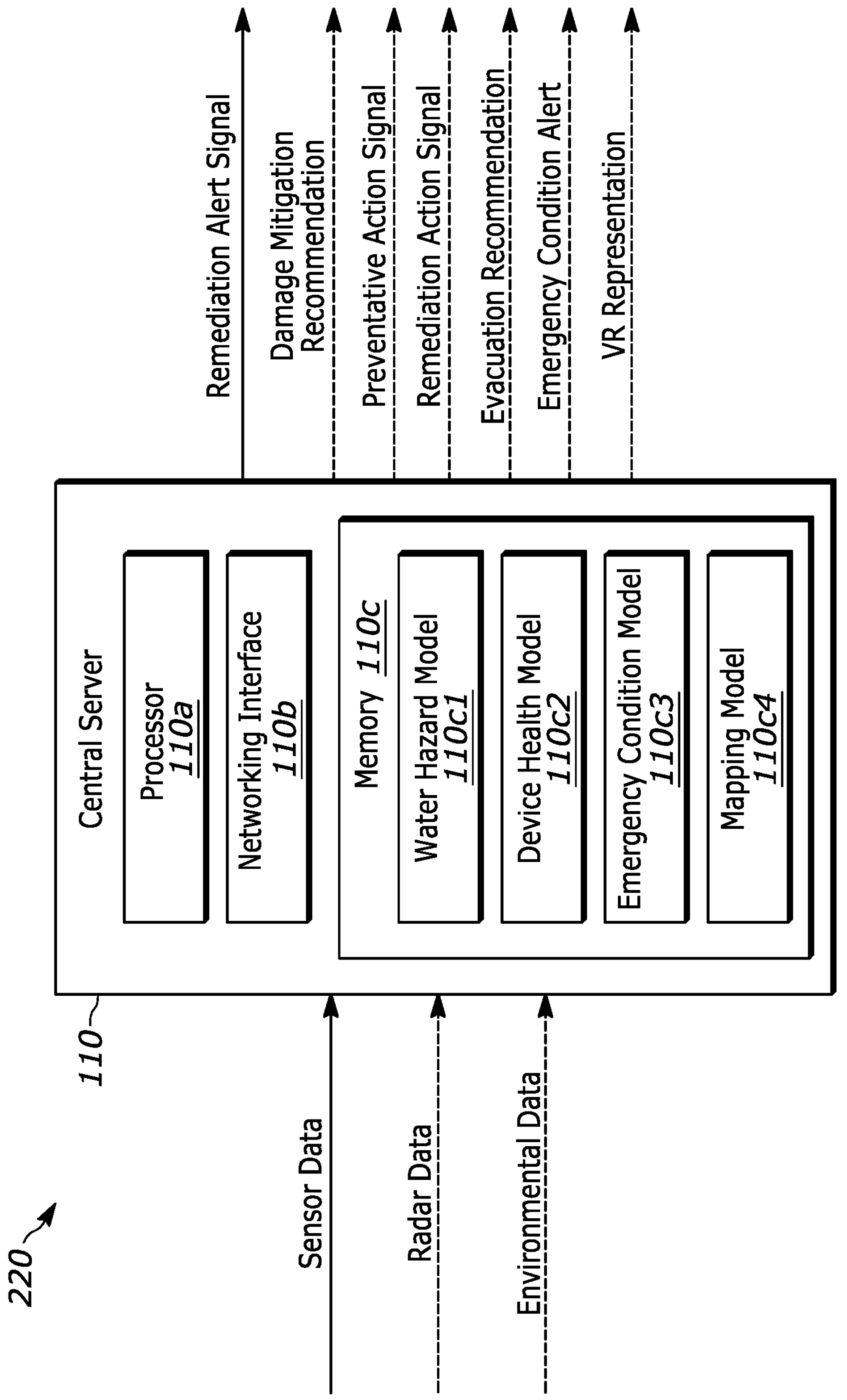
FIG. 2C depicts a third exemplary workflow for data input/output of a computing device of FIG. 1, in accordance with various embodiments described herein.

FIG. 2C, depicts a third exemplary workflow 220 for data input/output of a computing device (e.g., the central server 110) of FIG. 1, in accordance with various embodiments described herein. The third exemplary workflow 220 generally illustrates various data received/retrieved by the central server 110 that is utilized by the models 110*c*1-*c*4 as inputs to generate various outputs. The various data received/retrieved by the central server 110 includes sensor data, radar data, and environmental data. The various outputs generated by the models 110*c*1-*c*4 based upon the received/retrieved data includes a remediation alert signal, a damage mitigation recommendation, a preventative action signal, a remediation action signal, an evacuation recommendation, an emergency condition alert, and a VR representation.

As previously described, the sensor data, the radar data, and/or the environmental data received/retrieved by the central server 110 may include a large variety of specific information/data. For example, the sensor data may include data received from a sensor device (e.g., sensor device 130) proximate to a structure (e.g., inside and/or outside of the structure) or device, and/or any other suitable information or combinations thereof. The radar data may include forecasted/real-time radar data of a region surrounding and/or otherwise including the structure, and/or any other suitable data or combinations thereof. The environmental data may include data corresponding to weather and/or other meteorological conditions in regions that include the structure and/or the device.

Using this data as input, the models 110*c*1-*c*4 and other instructions stored in memory 110*c* may determine one or more of the outputs, such as the remediation alert signal, the damage mitigation recommendation, the preventative action signal, the remediation action signal, the evacuation recommendation, the emergency condition alert, and/or the VR representation. Of course, in certain instances, the central server 110 may not receive any radar data or environmental data. In these instances, the central server 110 may receive only the sensor data corresponding to a particular structure or device, and may generate at least the remediation alert signal for the particular structure or device.

As mentioned, the remediation alert signal may include contact information corresponding to at least one of the one or more remediation service providers. To determine this remediation alert signal, the central server 110 may receive from a sensor device (e.g., sensor device 130) disposed proximate to a structure or device, the sensor data. The central server 110 may then detect an emergency condition within a structure, and further determine a set of remediation services corresponding to the structure based upon the emergency condition. The emergency condition may be, for example, a cracked or burst water pipe in a basement of the structure that is causing flooding in the basement. The central server 110 may then identify one or more remediation service providers to perform the set of remediation services, and generate a remediation alert signal that includes contact information corresponding to at least one of the one or more remediation service providers. The central server 110 may also transmit the remediation alert signal to a user computing device of a user associated with the structure.

In some embodiments, prior to detecting the emergency condition, the central server 110 may detect a catastrophic event approaching the structure. For example, the central server 110 may utilize the radar data to determine that a hurricane is approaching the structure. The central server 110 may then generate a damage mitigation recommendation based upon the catastrophic event and the structure, and transmit the damage mitigation recommendation to the user computing device. Further in these embodiments, the central server 110 may, responsive to detecting the catastrophic event, determine whether or not the structure is occupied based upon signal data from one or more devices associated with the structure. Responsive to determining that the structure is not occupied, the central server 110 may then transmit a signal to a device within the structure to perform a preventative action corresponding to the catastrophic event.

For example, the central server 110 may analyze sound/vibration data of water pipes in the structure to determine that the structure is unoccupied because the sound/vibration data indicates that no water has recently flowed through the pipes. The central server 110 may then transmit a signal to shut off the water supply valve to the structure, and thereby prevent water damage resulting from water pipes bursting or leaking while the water is actively supplied to the structure. Regardless, further in these embodiments, the one or more devices associated with the structure may include: (i) a smart lock, (ii) a home security system, (iii) a water flow sensor, and/or any other suitable devices or combinations thereof.

In certain embodiments, the central server 110 may determine a remediation action based upon the emergency condition, where the remediation action may be associated with a device within the structure. The central server 110 may also transmit a signal to the device to perform the remediation action. For example, the remediation action may be activating a sump pump to reduce the amount of water present in a basement or lower levels of the structure after such levels has accumulated water.

In some embodiments, the central server 110, prior to detecting the emergency condition, may detect a catastrophic event approaching the structure (e.g., hurricane, tornado, blizzard, etc.). The central server 110 may aggregate signal data from a plurality of devices in a plurality of structures within a region including the structure, and determine an evacuation value associated with the region based upon the signal data from the plurality of devices. The central server 110 may then generate an evacuation recommendation based upon the evacuation value, and cause the evacuation recommendation to be displayed to the user. For example, the evacuation value may represent a percentage or other likelihood that the user should evacuate the structure to avoid experiencing the catastrophic event. The evacuation recommendation may include one or more recommended evacuation routes and/or safe areas that the user may use to evacuate from the region including the structure and thereby avoid the catastrophic event.

In certain embodiments, the central server 110, prior to detecting the emergency condition, may detect a catastrophic event approaching the structure, and may determine an emergency condition likelihood value based upon the catastrophic event. The central server 110 may further generate an emergency condition alert based upon the emergency condition likelihood value, and cause the emergency condition alert to be displayed to the user. The emergency condition likelihood value may be or represent a likelihood that the catastrophic event may result in an emergency condition corresponding to the structure, and the emergency condition alert may enable the user to view the emergency condition likelihood value to inform the user's decision to evacuate, prepare the structure for the catastrophic event, and/or other emergency preparedness considerations.

In some embodiments, the central server 110 may also utilize any of the sensor data, the radar data, the environmental data, and/or other suitable data to generate a virtual reality (VR) representation of the emergency condition within a VR environment. In these embodiments, the central server 110 may also cause the VR representation to be displayed to a user when the user views the VR environment, as discussed herein.

Exemplary Sensor and Data Collection Implementation

Figure 3A:
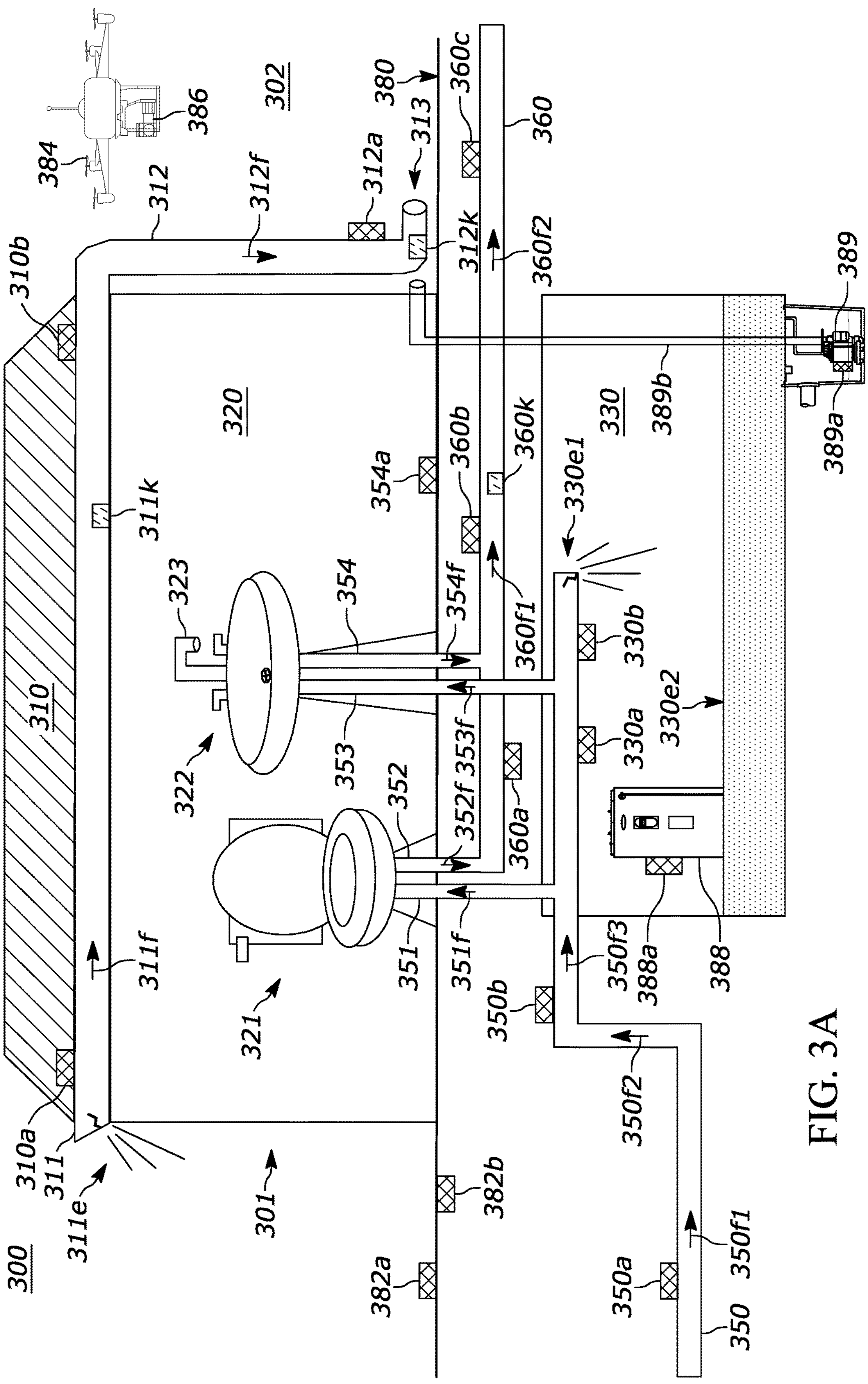
FIG. 3A illustrates an exemplary data collection implementation of a portion of the exemplary computing system of FIG. 1 with a structure to perform actions related to various embodiments of the present disclosure.

FIG. 3A illustrates an exemplary data collection implementation 300 of portions of the exemplary computing system 100 of FIG. 1 with a structure 301 to perform actions related to various embodiments of the present disclosure. In general, FIG. 3A illustrates multiple scenarios in which sensor devices (e.g., sensor device 130) may be disposed proximate to the structure 301 or particular devices to detect various conditions (e.g., cracked gutter, clogged gutter/pipe, burst pipe, flooding basement). Based upon the data collected by these sensor devices, the central server 110 or other suitable device may automatically alert a user of these various conditions, perform remediation/mitigation actions, and/or schedule remediation as necessary.

More generally, it should be understood that data originating from any sensor 310*a*, 310*b*, 312*a*, 330*a*, 330*b*, 350*a*, 350*b*, 354*a*, 360*a*, 360*b*, 360*c*, 382*a*, 382*b*, 388*a*, and 389*a* may be used to determine any suitable value described herein for a device/structure to which the sensor 310*a*, 310*b*, 312*a*, 330*a*, 330*b*, 350*a*, 350*b*, 354*a*, 360*a*, 360*b*, 360*c*, 382*a*, 382*b*, 388*a*, and 389*a* is proximally disposed. Moreover, the data originating from any sensor 310*a*, 310*b*, 312*a*, 330*a*, 330*b*, 350*a*, 350*b*, 354*a*, 360*a*, 360*b*, 360*c*, 382*a*, 382*b*, 388*a*, and 389*a* may be utilized in tandem with the sensor's location (generally or relative to other sensors) to, for example, detect a water level hazard condition, a health status, an emergency condition, a status change, determine a recommended remediation action, and/or any other values or estimations described herein.

Further, many of the values determined by the central server 110 as a result of data measured/generated by the sensors 310*a*, 310*b*, 312*a*, 330*a*, 330*b*, 350*a*, 350*b*, 354*a*, 360*a*, 360*b*, 360*c*, 382*a*, 382*b*, 388*a*, and 389*a* (e.g., a recommended remediation action) may include an action that a user may perform to restore or otherwise modify the operation of the device from a non-optimal state (e.g., blocked pipe, cracked pipe) to an optimal state (e.g., unblocked pipe, non-cracked pipe). As an example, a recommended remediation action may be or include a location of blockages 311*k*, 312*k*, 360*k* in the gutter 311, the gutter pipe 312, and the wastewater pipe 360, such that a user may locate the blockages 311*k*, 312*k*, 360*k* and remove them to restore the gutter 311, the gutter pipe 312, and/or the wastewater pipe 360 to normal/optimal operating conditions.

As illustrated in FIG. 3A, the structure 301 may have any number of devices that permit fluid flow and/or otherwise operate to manage water levels in the structure 301 or perform other functions. These devices may include, for example, a gutter 311, a gutter pipe 312, a toilet apparatus 321, a sink apparatus 322, a water supply pipe 350, a wastewater pipe 360, a water heater 388, a sump pump 389, and/or any other device or combinations thereof. At any given time, these devices may function properly or improperly, and thus may require constant monitoring to determine when maintenance/remediation is required. The sensors 310*a*, 310*b*, 312*a*, 330*a*, 330*b*, 350*a*, 350*b*, 354*a*, 360*a*, 360*b*, 360*c*, 382*a*, 382*b*, 388*a*, and 389*a* may generally passively measure data corresponding to devices or other values (e.g., water level data), and in certain instances, the sensors 310*a*, 310*b*, 312*a*, 330*a*, 330*b*, 350*a*, 350*b*, 354*a*, 360*a*, 360*b*, 360*c*, 382*a*, 382*b*, 388*a*, and 389*a* may transmit data to a central server (e.g., central server 110) in response to measured/observed data violating/exceeding a threshold value.

For example, a water level threshold may be six inches or approximately fifteen centimeters above the level of the water level sensors 382*a*, 382*b*, and the sensors 382*a*, 382*b* may detect a water level of seven inches that exceeds the water level threshold. In this example, the water level sensors 382*a*, 382*b* may transmit the water level signal data representing the seven inches above the level of the sensors 382*a*, 382*b* to the central server 110 in response to the water level exceeding the water level threshold. The central server 110 may then analyze this water level signal data to determine a water hazard condition and/or a recommended remediation action.

In any event, the structure 301 may have a gutter 311 affixed under and traversing a lowest point of the roof 310 to utilize gravity and thereby funnel rainwater off the roof 310 and away from the structure 301. In this manner, the gutter 311 may help prevent erosion of the ground 380 directly below the edge of the roof 310, among other benefits, and may provide efficient movement of water away from the structure 301. Consequently, any condition that hinders this movement of water provided by the gutter 311 may result in costly damages from water pooling, seepage, and/or other issues.

Such conditions may include, for example, a broken gutter portion 311*e* which spills water down a side of the structure 301, or a buildup of leaves 311*k* preventing water flow 311*f* through the gutter 311. The gutter pipe 312 may also be susceptible to a blockage 312*k* and thereby not allow water to pass through the gutter pipe opening 313 to an appropriate distance away from the structure (e.g., 10-15 feet) in the direction indicated by the water flow 312*f*. To alleviate these issues, sensors 310*a*, 310*b*, 312*a* may be disposed proximate to the gutter 311 and/or to the gutter pipe 312 and gutter pipe opening 313 to continually record and transmit ambient vibration and/or sound data to the central server 110 via a signal, thereby monitoring the gutter 311, the gutter pipe 312, and/or the gutter pipe opening 313.

As an example, the central server 110 may receive and process the vibration signals and/or sound data to detect a status change of the gutter 311, the gutter pipe 312, and/or the gutter pipe opening 313 and determine a recommended remediation action. The gutter pipe sensor 312*a* may be proximate to the gutter pipe opening 313, while the rightmost roof sensor 310*b* may be less proximate to the gutter pipe opening 313 and the blockage 312*k*. In this example, the data measured, generated, and/or otherwise received by the gutter pipe sensor 312*a* may be analyzed in conjunction with the data from the rightmost roof sensor 310*b* to determine a status change corresponding to the blockage 312*k* and/or a recommended remediation action. Namely, the gutter pipe sensor 312*a* may measure vibration data indicating that the gutter pipe 312 nearby the gutter pipe sensor 312*a* may be vibrating in a manner that is characteristic of low water flow, while the rightmost roof sensor 310*b* may measure vibration data indicating that the gutter 311 is vibrating in a manner that is characteristic of high water flow. This dichotomy between the vibration data measured by the two sensors 310*b*, 312*a* may enable the central server 110 to detect a status change representing the blockage 312*k* and/or to determine that the blockage 312*k* may be closer to the gutter pipe sensor 312*a*.

Continuing the prior example, the central server 110 may receive this vibration and/or sound data from the sensors 310*b*, 312*a*, and may generate an alert signal indicating the status change and the recommended remediation action. The central server 110 may then transmit the alert signal to a user computing device (e.g., user computing device 120) for display to the user. Accordingly, the user may review the alert signal, and may then inspect the gutter 311, the gutter pipe 312, and/or the gutter pipe opening 313 for a blockage 311*k*, 312*k* and work to adjust the current flow rate of the gutter 311, the gutter pipe 312, and/or the gutter pipe opening 313 to a prior flow rate.

As further illustrated in FIG. 3, the interior 320 of the structure 301 may include a toilet apparatus 321 and a sink apparatus 322 may occupy the structure interior 320 to service the occupants of the structure 301. The toilet apparatus 321 and the sink apparatus 322 may utilize water supply pipes 351, 353 to supply water for use by users and water outflow pipes 352, 354 to transport wastewater away from the structure 301. Prior to the water flowing into the water supply pipes 351, 352, the water may flow to the structure 301 through the water supply pipe 350 in the direction indicated by the arrows **350*f*1, 350*f*2, and 350*f*3. Similarly, when the wastewater flows through the water outflow pipes 352, 354, the water may flow away from the structure 301 through the wastewater pipe 360 in the direction indicated by the arrows 360*f*1 and 360*f*2**.

The directionality of the fluid flow within the water supply/outflow pipes 351,352, 353, 354 may be illustrated by the arrows **351*f*, 352*f*, 353*f*, 354*f*, and sensors 350*b*, 354*a*, 360*a*, 360*b* proximate to the water supply/outflow pipes 351,352, 353, 354 may be configured to measure data corresponding to the use of the toilet apparatus 321 and the sink apparatus 322. Based upon this measured data, the central server 110 may determine/detect health statuses, emergency conditions, and/or other conditions related to the toilet apparatus 321 and/or the sink apparatus 322**.

For example, a user may accidentally leave a faucet 323 of the sink apparatus 322 running after use, thereby allowing water to overflow the bowl of the sink apparatus 322, spill over to the floor of the structure interior 320, and cause subsequent water damage to the floor surface or subsurface. Another example may be or include the faucet 323 or surrounding pipes 353, 354 continuously leaking regardless of proper operation by a user. Overtime, small drips from the faucet 323 or surrounding pipes 353, 354 may contribute to significant damages to the floor of the structure interior 320 and/or the sink apparatus 322. However, in either example, the sensors **350*b*, 354*a*, 360*a*, 360*b* (or other sensors) proximate to the water supply/outflow pipes 351,352, 353, 354 and/or the sink apparatus 322 may detect/measure sounds representative of a consistent water drip. The sensors 350*b*, 354*a*, 360*a*, 360*b* may transmit this sound data to the central server 110, and the server 110** may determine a recommended remediation action (e.g., tightening seals, applying caulk to seals, etc.) based upon the sound data.

As further illustrated in FIG. 3, the basement 330 of the structure 301 may include sensors **330*a*, 330*b* disposed proximate to a portion of the water supply pipe 350, a cracked portion 330*e*1 of the water supply pipe 350, a water level 330*e*2 resulting from the cracked portion 330*e*1 of the water supply pipe 350, a water heater 388, a sensor 388*a* disposed proximate to the water heater 388, a sump pump 389, a sensor 389*a* disposed proximate to the sump pump 389, and a discharge line 389*b*. Each of the sensors 330*a*, 330*b*, 388*a*, 389*a* disposed in the basement 330 may similarly measure, generate, and/or otherwise record data corresponding to the proximate devices (e.g., water supply pipe 350, water heater 388, sump pump 389**).

For example, the sensor **388*a* disposed proximate to the water heater 388 may measure, generate, and/or otherwise record usage data of the water heater 388. The usage data may generally indicate how often the water heater 388 is turned on to heat water, and may also include electrical consumption data corresponding to a current draw level of the water heater 388 when heating water. In particular, the sensor 388*a* may be integrated with any digital operating systems of the water heater 388 to retrieve such usage data directly from the operating systems, and/or the sensor 388** may include an amp meter, a thermometer, and/or sound/vibration measuring devices to indirectly measure, generate, and/or otherwise record the usage data.

In any event, the usage data may indicate that the water heater 388 is actively heating water for one hour per day longer than is recommended for the water heater 388, and that the water heater is drawing a slightly elevated level of current while in operation. The sensor **388*a* may measure, generate, and/or otherwise record this usage data, and may transmit this usage data to the central server 110 for processing. The central server 110 may then analyze the usage data of the water heater 388 and determine/generate an alert signal that includes a recommended usage adjustment for the user to reduce the amount of hot water use within the structure 301 and/or to potentially seek maintenance/repair services to return the water heater 388** to a normal operating condition with a non-elevated current draw.

In another example, the sensors **330*a*, 330*b* disposed proximate to the water supply pipe 350 may measure, generate, and/or otherwise record sensor data (e.g., sound/vibration data) corresponding to the water supply pipe 350. The sensor data may generally indicate that the water supply pipe 350 has experienced a change in normal operating conditions, based upon the difference(s) between the sensor data collected at the time represented in the exemplary data collection implementation 300 and another prior time where the cracked portion 330*e*1 of the water supply pipe 350** was not cracked.

More specifically, the sensor data may indicate that the cracked portion **330*e*1 of the water supply pipe 350 has cracked, and is actively leaking water into the basement. The sensors 330*a*, 330*b* may measure, generate, and/or otherwise record this sensor data, and may transmit this sensor data to the central server 110 for processing. The central server 110 may then analyze the sensor data of the water supply pipe 350 and determine/generate a remediation alert signal that may include an indication of the emergency condition (e.g., flooding in the basement 330) along with contact information for a remediation service provider to provide remediation services (e.g., reducing the water level 330*e*2 resulting from the cracked portion 330*e*1 of the water supply pipe 350) and fix any resulting damage to the basement 330**.

As further illustrated in FIG. 3, the exterior 302 of the structure 301 may also include water level sensors **382*a*, 382*b* and a UAV 384 with an attached sensor 386. As previously mentioned, the water level sensors 382*a*, 382*b* may generally measure water levels of the areas surrounding the structure 301, and these sensors 382*a*, 382*b* may be disposed above the ground 380 and/or below the ground 380. The UAV 384 may be configured to fly over the structure 301 and capture/record sensor data of the structure 301 and/or areas surrounding the structure 301 using the attached sensor 386. The attached sensor 386** may generally be or include an imaging device, such as a 3D scanning device, a time of flight sensor, visual imaging camera and/or video camera, an infrared camera, and/or any other suitable imaging device or combinations thereof.

As an example, the water level sensors **382*a*, 382*b* may measure, generate, and/or otherwise record water level data indicating that the water level is one foot and eight inches above the location of the water level sensors 382*a*, 382*b* disposed proximate to the structure 301. The water level sensors 382*a*, 382*b* may transmit a water level signal to the central server 110 that includes this water level data, and the central server 110 may then determine the one foot and eight inches water level proximate to the structure 301 based on the water level signal. The central server 110 may then detect a water hazard condition (e.g., likely flooding in the structure 301) based on the water level proximate to the structure 301. The central server 110 may also determine a recommended mitigation action (e.g., pumping flood water out of the structure 301) to mitigate damage to the structure 301 from the water hazard condition and/or a cause of the water hazard condition (e.g., damaged doorframe or window frame seals). As a result, the central server 110 may also generate and output an alert signal indicating the water hazard condition and the recommended mitigation action for transmission to a user computing device (e.g., user computing device 120**) for display to a user.

As another example, the attached sensor 386 may be configured to generate 3D scan data of ground 380 proximate to the structure 301. The UAV 384 may fly/hover above the structure 301 and/or the ground 380, and the attached sensor 386 may capture 3D scan data of the ground 380 via one or more image captures, video capture, and/or other suitable data capture.

In this example, the central server 110 may receive the 3D scan data of the ground 380 proximate to the structure 301 from the attached sensor 386, and the central server 110 may identify ground slopes of the ground 380 proximate to the structure 301. The central server 110 may then determine a recommended modification to the ground 380 proximate to the structure 301 based on the ground slopes determined from the 3D scan data. For example, the central server 110 may determine that the user should install one or more drains in various locations of the ground 380 that slope away from the structure 301 to expedite and/or otherwise facilitate water flow away from the structure 301 and its foundation.

Figure 3B:
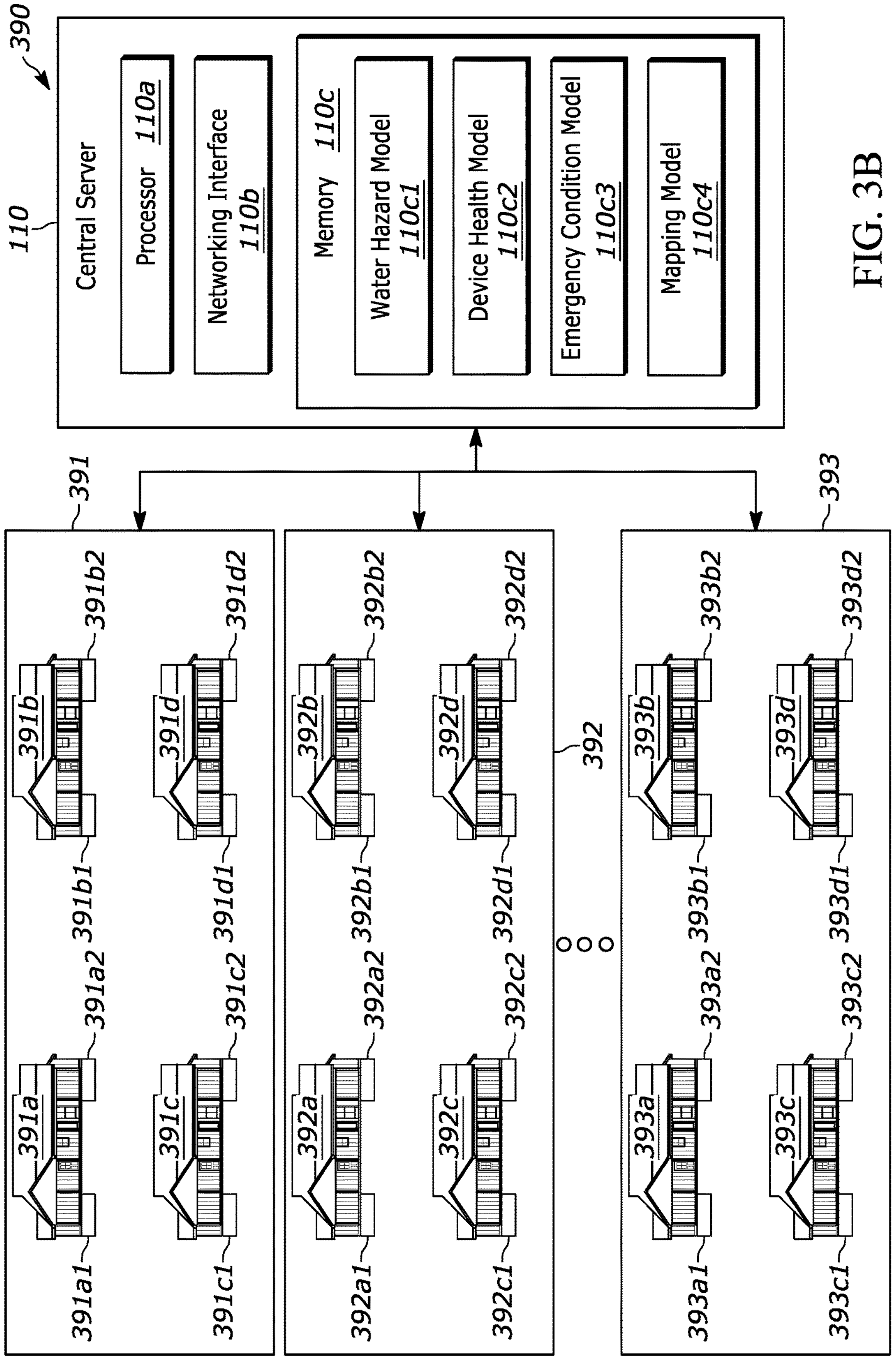
FIG. 3B illustrates another exemplary data collection implementation of a portion of the exemplary computing system of FIG. 1 with a plurality of structures in multiple regions to perform actions related to various embodiments of the present disclosure.

FIG. 3B illustrates another exemplary data collection implementation 390 of a portion of the exemplary computing system 100 of FIG. 1 with a plurality of structures 391*a-d*, 392*a-d*, 393*a-d* in multiple regions 391, 392, 393 (also referenced herein as a "plurality of regions") to perform actions related to various embodiments of the present disclosure. In particular, the multiple regions 391, 392, 393 may represent regions within a country, a state, a province, a county, a parish, a city, a town, a neighborhood, etc., and/or a sub-region therein or any suitable area or combinations thereof. The structures 391*a-d*, 392*a-d*, 393*a-d* may represent any suitable number of structures that are located within the multiple regions 391, 392, 393. For example, the first region 391 may be or include a city, such that the structures 391*a-d* represent hundreds of thousands of structures. The second region 392 may be or include a town, such that the structures 392*a-d* represent tens of thousands of structures. The third region 393 may be or include a neighborhood, such that the structures 393*a-d* represent hundreds of structures.

Regardless, it should be appreciated that the multiple regions 391-393 may include any suitable number of regions that represent any suitable collections of structures 391*a-d*, 392*a-d*, 393*a-d*, and that the structures 391*a-d*, 392*a-d*, 393*a-d* may be or include any suitable number of structures. Moreover, each structure 391*a-d*, 392*a-d*, 393*a-d* may include a plurality of sensors 391*a*1, 391*a*2, 391*b*1, 391*b*2, 391*c*1, 391*c*2, 391*d*1, 391*d*2, 392*a*1, 392*a*2, 392*b*1, 392*b*2, 392*c*1, 392*c*2, 392*d*1, 392*d*2, 393*a*1, 393*a*2, 393*b*1, 393*b*2, 393*c*1, 393*c*2, 393*d*1, 393*d*2 (referenced herein collectively as "sensors 391*a*1-393*d*2"), and these sensors 391*a*1-393*d*2 may also include any suitable number of sensors disposed at any suitable location with respect to the corresponding structure(s) 391*a-d*, 392*a-d*, 393*a-d*.

As illustrated in the exemplary data collection implementation 390 of FIG. 3B, the central server 110 may receive data from each region 391, 392, 393, and may generally communicate with those regions 391, 392, 393, for example, transmitting signals to devices in the structures 391*a-d*, 392*a-d*, 393*a-d* and/or to user computing devices (e.g., user computing device 120) of users that are associated with the structures 391*a-d*, 392*a-d*, 393*a-d*. In this manner, the central server 110 may aggregate data from the plurality of regions 391, 392, 393 to determine/generate values and/or maps/zones corresponding to the plurality of regions 391, 392, 393.

For example, at least one of the sensors 391*a*1-393*d*2 associated with each structure 391*a-d*, 392*a-d*, 393*a-d* may be or include a sensor configured to measure/detect water level data proximate to the associated structure 391*a-d*, 392*a-d*, 393*a-d*. In this example, the central server 110 may aggregate water level signals from each of the sensors that are configured to measure/detect water level data in each of the regions 391, 392, 393. The central server 110 may then create a regional water level map (e.g., via mapping model 110*c*4) that represents water level conditions in each region 391, 392, 393 for which the central server 110 receives water level data. The central server 110 may then cause the regional water level map to be displayed to a user, as discussed further herein.

As another example, the central server 110 may also retrieve radar data representing weather conditions within each region 391, 392, 393 and/or any individual region 391, 392, 393, to determine a predicted water level at a first time in the future relative to the current time when the central server 110 retrieves the radar data. The central server 110 may then determine a predicted water level at the first time based on the radar data and the water level signals from the plurality of sensors 391*a*1-393*d*2. For example, the radar data may indicate an approaching storm system, such that the central server 110 may utilize the water hazard model 110*c*1 to predict a water level in each region 391, 392, 393 based upon the radar data and the current water level in each region 391, 392, 393.

In this example, the current water level may be at ground level for each region 391, 392, 393, and the central server 110 may generate a predicted water level indicating that the water level at the first time in the first region 391 may be two inches above ground level, the water level at the first time in the second region 392 may be four inches above ground level, and the water level at the first time in the third region 393 may remain at ground level because the storm system may be predicted to miss the third region 393 entirely. Accordingly, the central server 110 may then generate a predicted alert signal indicating (i) the predicted water level at the first time for a region 391, 392, 393 in which the user's computing device (e.g., user computing device 120) is located, and (ii) a predicted mitigation action the user may take to mitigate potential damaging effects from the predicted water level at the first time.

Exemplary Graphical User Interfaces (GUIs)

Figure 4A:
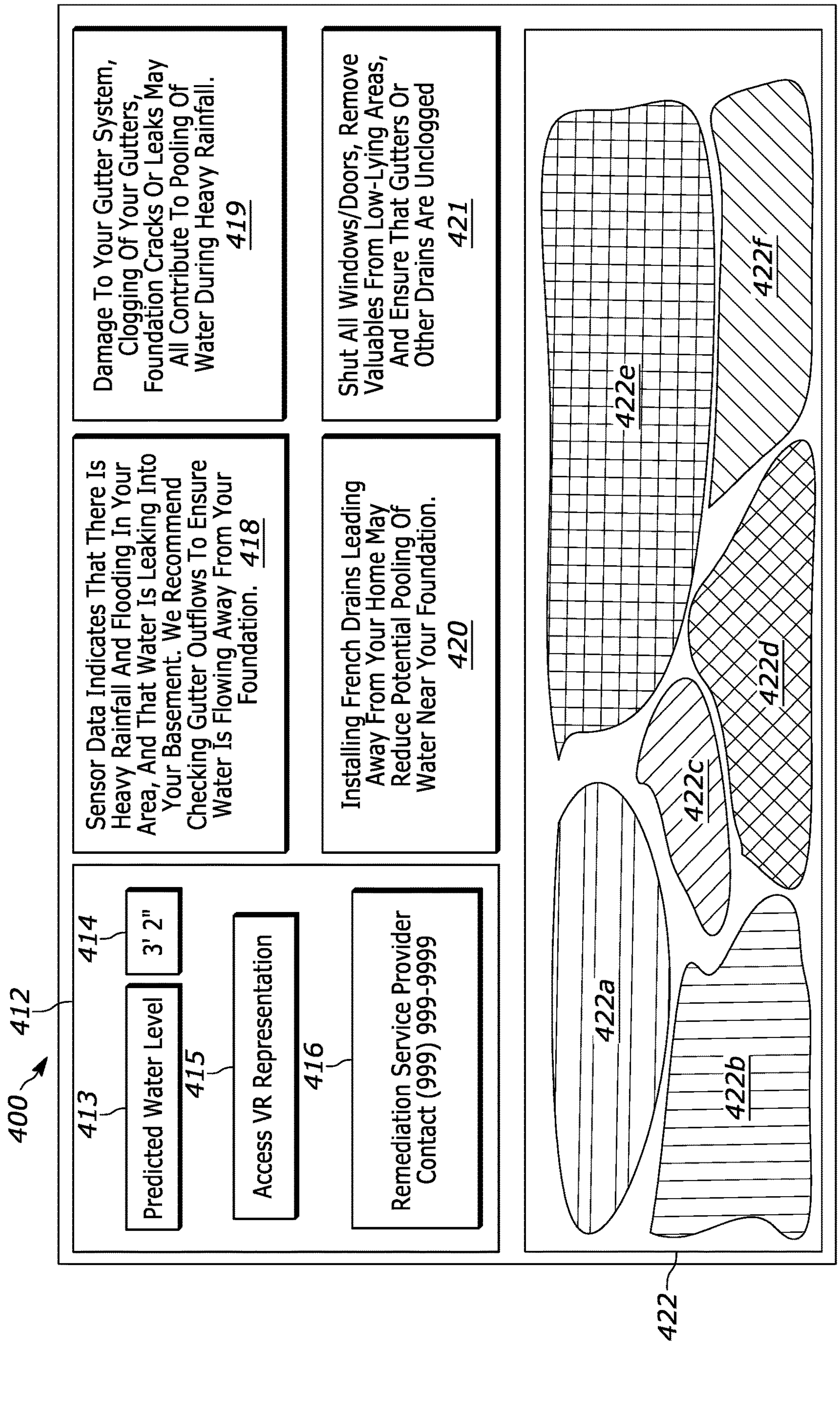
FIG. 4A depicts a first exemplary graphical user interface (GUI) that may be displayed on a user computing device of FIG. 1, in accordance with various embodiments described herein.

FIG. 4A depicts a first exemplary GUI 400 that may be displayed on a user computing device (e.g., user computing device 120) of FIG. 1, in accordance with various embodiments described herein. Generally, the first exemplary GUI 400 allows a user to interact with the central server 110, which may include receiving outputs from the central server 110 or sending inputs to the central server 110 as described in reference to the first exemplary workflow 200 of FIG. 2A. The first exemplary GUI 400 thus provides the user with a designated place to remain informed regarding the functioning of a computing system configured to monitor devices and structures (e.g., exemplary computing system 100). In particular, the first exemplary GUI 400 may display information, values, maps, contact information, and/or other data related to water levels proximate to and/or otherwise associated with a structure.

Namely, the first exemplary GUI 400 may include a first display hub 412, an alert signal hub 418, a cause of water hazard condition hub 419, a structure recommendation hub 420, a predicted mitigation action hub 421, and a regional water level map hub 422. The first display hub 412 may include a predicted water level indication 413, a predicted water level value 414, an interactive VR representation button 415, and remediation service provider contact information 416. The user may directly interact (e.g., click, swipe, tap, gesture, voice command, etc.) with the interactive VR representation button 415, and the remediation service provider contact information 416 to initiate additional actions that may direct the user away from the first exemplary GUI 400.

For example, interacting with the interactive VR representation button 415 may cause the user computing device 120 to instruct the user to prepare a VR headset (not shown), and the user computing device 120 may then render and/or otherwise cause the user to view a representation of the user's associated structure and/or ground surrounding and/or otherwise proximate to the user's associated structure along with one or more recommendations related to the structure and/or ground. The user may view the VR environment, and the user computing device 120 may render a structural recommendation in the VR environment by highlighting and/or otherwise indicating an area or device referenced by the structural recommendation in the VR environment for viewing by the user. For example, the user may view the VR environment, and the user computing device 120 may cause a recommendation for additional drainage on the user's front lawn to be displayed to the user in the VR environment by highlighting one or more areas on the ground proximate to the structure where the user computing device 120 recommends the user place additional drainage.

Additionally, interacting with the remediation service provider contact information 416 may cause the user computing device 120 to initiate a communication (e.g., phone call) between the user and the remediation service provider (e.g., via remediation service provider computing device 140). In other words, when the user interacts with the remediation service provider contact information 416, the user computing device 120 may automatically exit and/or close the first exemplary GUI 400, and the user computing device 120 may open and/or otherwise activate a phone calling application or function, dial the number (e.g., (999) 999-999 in FIG. 4A) associated with the remediation service provider, and thereby enable the user to communicate directly with an employee or other representative of the remediation service provider. Of course, as previously mentioned, such communication initiated by the user computing device 120 may be or include, without limitation, a phone call, a web chat, an email, a text message, and/or any other suitable communication medium or combinations thereof.

The predicted water level indication 413 and predicted water level value 414 may generally correspond to a predicted water level proximate to a structure associated with a user at some time in the future (e.g., the first time described in reference to FIG. 3B). In this manner, the user may view the predicted water level value 414 and understand approximately what water level an approaching storm system or catastrophic event may cause proximate to the structure. The user may then take preventative actions, such as removing objects from a basement, moving objects off of the floor, and/or making sure that all doors and windows are closed prior to the storm system or catastrophic event reaching the structure.

Each of the alert signal hub 418, the cause of water hazard condition hub 419, the structure recommendation hub 420, and the predicted mitigation action hub 421 may provide instructions, values, recommendations, and/or other indications to a user related to data processed by the central server 110. For example, the alert signal hub 418 states that "[s]ensor data indicates that there is heavy rainfall and flooding in your area, and that water is leaking into your basement. We recommend checking gutter outflows to ensure water is flowing away from your foundation." The user may view this alert signal in the alert signal hub 418, and the user may check gutters (e.g., gutter 311) or other devices (e.g., sump pump 389) for optimal operating conditions to ensure that the heavy rainfall or flooding causes a minimal amount of damage, or no damage at all.

As another example, and as illustrated in FIG. 4A, the cause of water hazard condition hub 419 states that "[d] amage to your gutter system, clogging of your gutters, foundation cracks or leaks may all contribute to pooling of water during heavy rainfall." The user may view these potential causes in the cause of water hazard condition hub 419, and the user may check gutters (e.g., gutter 311) or other devices (e.g., sump pump 389) to ensure that these devices are not currently damaged, and if they are, then repair the damage. Additionally, depending on the specific water hazard condition, the user may also engage with a remediation service provider (e.g., via remediation service provider contact information 416) to receive remediation services corresponding to potential foundation issues.

As yet another example, and as illustrated in FIG. 4A, the structure recommendation hub 420 states that "[i]nstalling French drains leading away from your home may reduce potential pooling of water near your foundation." The user may view this structure recommendation in the structure recommendation hub 420, and the user may examine the ground proximate the structure and/or access a VR representation of the ground surrounding the structure (e.g., via interactive VR representation button 415) to examine areas for potential French drain installation.

As still another example, and as illustrated in FIG. 4A, the predicted mitigation action hub 421 states "[s]hut all windows/doors, remove valuables from low-lying areas, and ensure that gutters or other drains are unclogged." The user may view this predicted mitigation action in the predicted mitigation action hub 421, and the user may check gutters (e.g., gutter 311) or other devices (e.g., sump pump 389) for optimal operating conditions, remove any valuables and non-waterproof items from the floor or basement, and/or other similar actions to mitigate the amount of damage that heavy rainfall or flooding may cause.

The regional water level map hub 422 may generally represent water level conditions in various regions 422*a-f*, at least one of which, may include the structure corresponding to the user accessing the first exemplary GUI 400. The central server 110 may have aggregated water level signal data from a plurality of sensors disposed proximate to a plurality of structures, as discussed in reference to at least FIG. 3B, and the central server 110 may generate the regional water map displayed in the regional water level map hub 422. For example, the regional water level map in the regional water level map hub 422 may include a plurality of regions 422*a-f* that may each have a different corresponding water level. The first region 422*a* may have a water level that is approximately ground level, the second region 422*b* may have a water level that is approximately two inches above the water level sensors in the second region 422*b*, the third region 422*c* may have a water level that is approximately two inches below the water level sensors in the third region 422*c*, the fourth region 422*d* may have a water level that is approximately five inches below the water level sensors in the fourth region 422*d*, the fifth region 422*e* may have a water level that is approximately six inches below the water level sensors in the fifth region 422*e*, and the sixth region 422*f* may have a water level that is approximately ground level. Of course, it should be understood that the water levels in the various regions 422*a-f* may be any suitable value, and the regional water level map displayed in the regional water level map hub 422 may include any suitable number of regions 422*a-f* that have any suitable shapes.

Figure 4B:
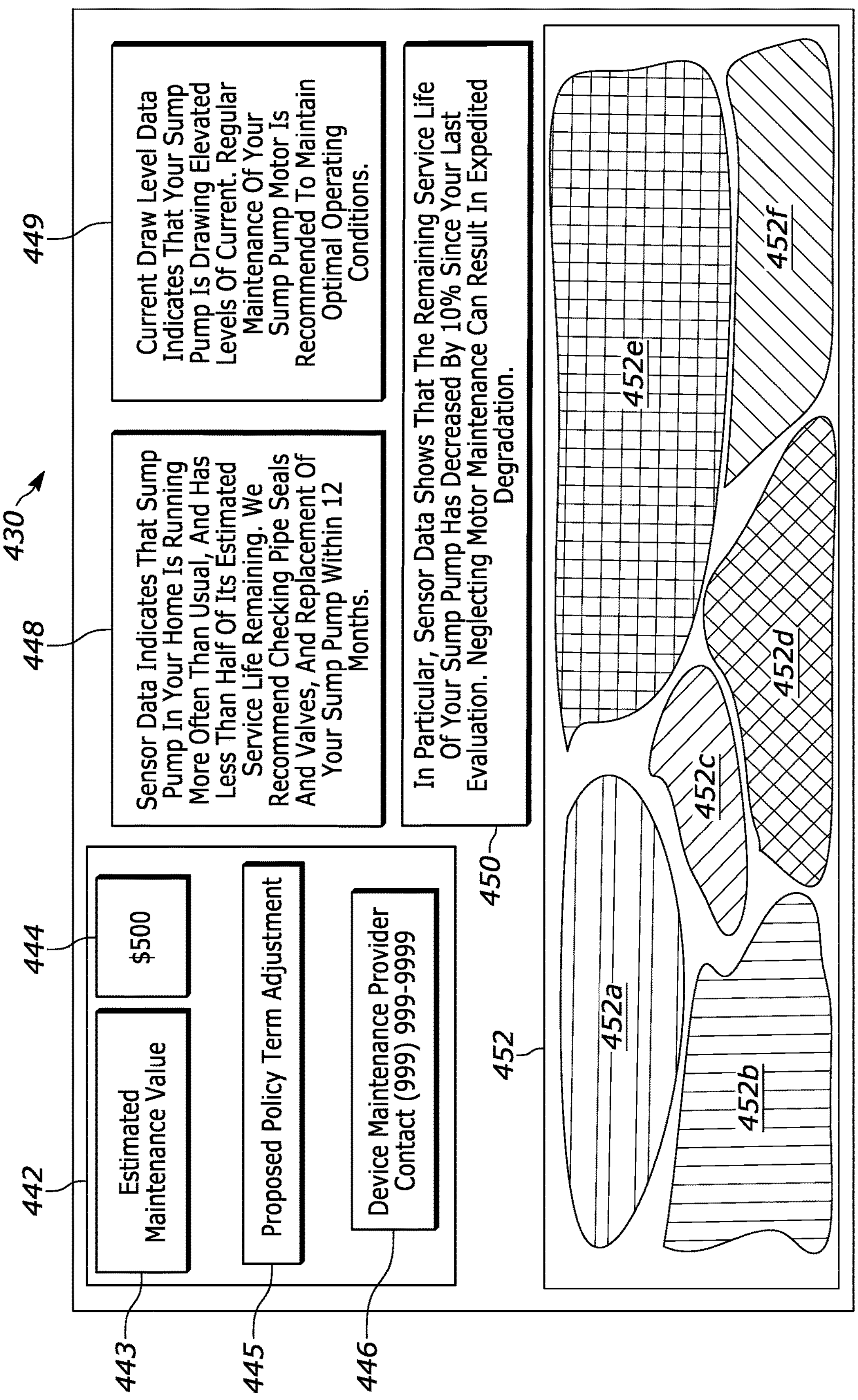
FIG. 4B depicts a second exemplary graphical user interface (GUI) that may be displayed on a user computing device of FIG. 1, in accordance with various embodiments described herein.

FIG. 4B depicts a second exemplary GUI 430 that may be displayed on a user computing device 120 of FIG. 1, in accordance with various embodiments described herein. Generally, the second exemplary GUI 430 allows a user to interact with the central server 110, which may include receiving outputs from the central server 110 or sending inputs to the central server 110 as described in reference to the second exemplary workflow 210 of FIG. 2B. The second exemplary GUI 430 thus provides the user with a designated place to remain informed regarding the functioning of a computing system configured to monitor devices and structures (e.g., exemplary computing system 100). In particular, the second exemplary GUI 430 may display information, values, maps, contact information, and/or other data related to usage data of a device within and/or otherwise associated with a structure.

Namely, the second exemplary GUI 430 may include a first display hub 442, an alert signal hub 448, a recommended usage adjustment hub 449, a cause of health difference hub 450, and a regional usage map hub 452. The first display hub 442 may include an estimated maintenance value indication 443, an estimated maintenance value 444, a proposed policy term adjustment button 445, and device maintenance provider contact information 446. The user may directly interact (e.g., click, swipe, tap, gesture, voice command, etc.) with the proposed policy term adjustment button 445, and the device maintenance provider contact information 446 to initiate additional actions that may direct the user away from the second exemplary GUI 430.

For example, interacting with the proposed policy term adjustment button 445 may cause the user computing device 120 to render and/or otherwise display one or more proposed adjustments to an insurance policy or other policy associated with a structure or device. For example, the user may interact with the proposed policy term adjustment button 445, and the user computing device 120 may exit and/or close the second exemplary GUI 400 and open a webpage or other document that indicates the proposed policy term adjustment(s) (e.g., decreased premium, discounts, free insurance, etc.). In one example, when the usage data generally indicates that the user is taking exemplary care of their insured structure or device, the proposed policy term adjustment button 445 may cause the user to receive proposed policy term adjustments to reduce the deductible and/or the premium of the insurance policy covering the structure or device.

Additionally, interacting with the device maintenance provider contact information 446 may cause the user computing device 120 to initiate a communication (e.g., phone call) between the user and the device maintenance provider (e.g., via remediation service provider computing device 140). In other words, when the user interacts with the device maintenance provider contact information 446, the user computing device 120 may automatically exit and/or close the second exemplary GUI 430, and the user computing device 120 may open and/or otherwise activate a phone calling application or function, dial the number (e.g., (999) 999-999 in FIG. 4B) associated with the device maintenance provider, and thereby enable the user to communicate directly with an employee or other representative of the device maintenance provider. Of course, as previously mentioned, such communication initiated by the user computing device 120 may be or include, without limitation, a phone call, a web chat, an email, a text message, and/or any other suitable communication medium or combinations thereof.

The estimated maintenance value indication 443 and the estimated maintenance value 444 may generally correspond to an estimated cost or value of maintenance that is proposed for a structure or device. In this manner, the user may view the estimated maintenance value 444 and understand approximately what it may cost to maintain and/or repair a device that is malfunctioning and/or due for routine maintenance. The user may then take preventative actions, such as scheduling the structure or device for maintenance with a device maintenance provider (e.g., via device maintenance provider contact information 446).

Each of the alert signal hub 418, the alert signal hub 448, the recommended usage adjustment hub 449, and the cause of health difference hub 450 may provide instructions, values, recommendations, and/or other indications to a user related to data processed by the central server 110. For example, the alert signal hub 448 states that "[s]ensor data indicates that sump pump in your home is running more often than usual, and has less than half of its estimated service life remaining. We recommend checking pipe seals and valves, and replacement of your sump pump within 12 months." The user may view this alert signal in the alert signal hub 448, and the user may check the sump pump (e.g., sump pump 389) for optimal operating conditions to ensure that the heavy rainfall or flooding causes a minimal amount of damage, or no damage at all.

As another example, and as illustrated in FIG. 4B, the recommended usage adjustment hub 449 states that "[c]urrent draw level data indicates that your sump pump is drawing elevated levels of current. Regular maintenance of your sump pump motor is recommended to maintain optimal operating conditions." The user may view these recommended usage adjustments and/or maintenance recommendations in the recommended usage adjustment hub 449, and the user may check the sump pump to ensure that no components of the sump pump are visibly and/or otherwise obviously damaged, and if they are, then repair the damage. Additionally, depending on the health status of the sump pump, the user may also engage with a device maintenance provider (e.g., via device maintenance provider contact information 446) to receive device maintenance services corresponding to potential issues with the sump pump and/or other devices.

As yet another example, and as illustrated in FIG. 4B, the cause of health difference hub 450 states that "[i]n particular, sensor data shows that the remaining service life of your sump pump has decreased by 10% since your last evaluation. Neglecting motor maintenance can result in expedited degradation." The user may view this proposed cause of health difference in the cause of health difference hub 450, and the user may determine whether or not to contact a device maintenance provider (e.g., via device maintenance provider contact information 446) to receive device maintenance services corresponding to potential issues with the sump pump and/or other devices. The user may also consider scheduling regular or recurring maintenance visits with the device maintenance provider as a result of viewing the cause of health difference in the cause of health difference hub 450.

The regional usage map hub 452 may generally represent device usage conditions in various regions 452*a-f*, at least one of which, may include the structure corresponding to the user accessing the second exemplary GUI 430. The central server 110 may have aggregated device usage data from a plurality of sensors disposed proximate to a plurality of structures or devices, as discussed in reference to at least FIG. 3B, and the central server 110 may generate the regional usage map displayed in the regional usage map hub 452. For example, the regional usage map in the regional usage map hub 452 may include a plurality of regions 452*a-f* that may each have a different corresponding usage level/value. The first region 452*a* may have a usage level/value that is relatively low, the second region 452*b* may have a usage level/value that is relatively average, the third region 452*c* may have a usage level/value that is relatively high, the fourth region 452*d* may have a usage level/value that is relatively high, the fifth region 452*e* may have a usage level/value that is relatively average, and the sixth region 452*f* may have a usage level/value that is relatively low.

Of course, it should be understood that the usage levels/values in the various regions 452*a-f* may be any suitable value, such as remaining device service life, average watt-hours consumed by device, average maintenance costs for the device, and the usage levels/values may correspond to any suitable device(s) (e.g., water heater 388, sump pump 389) and/or combinations thereof. Further, the regional usage map displayed in the regional usage map hub 452 may include any suitable number of regions 452*a-f* that have any suitable shapes.

Figure 4C:
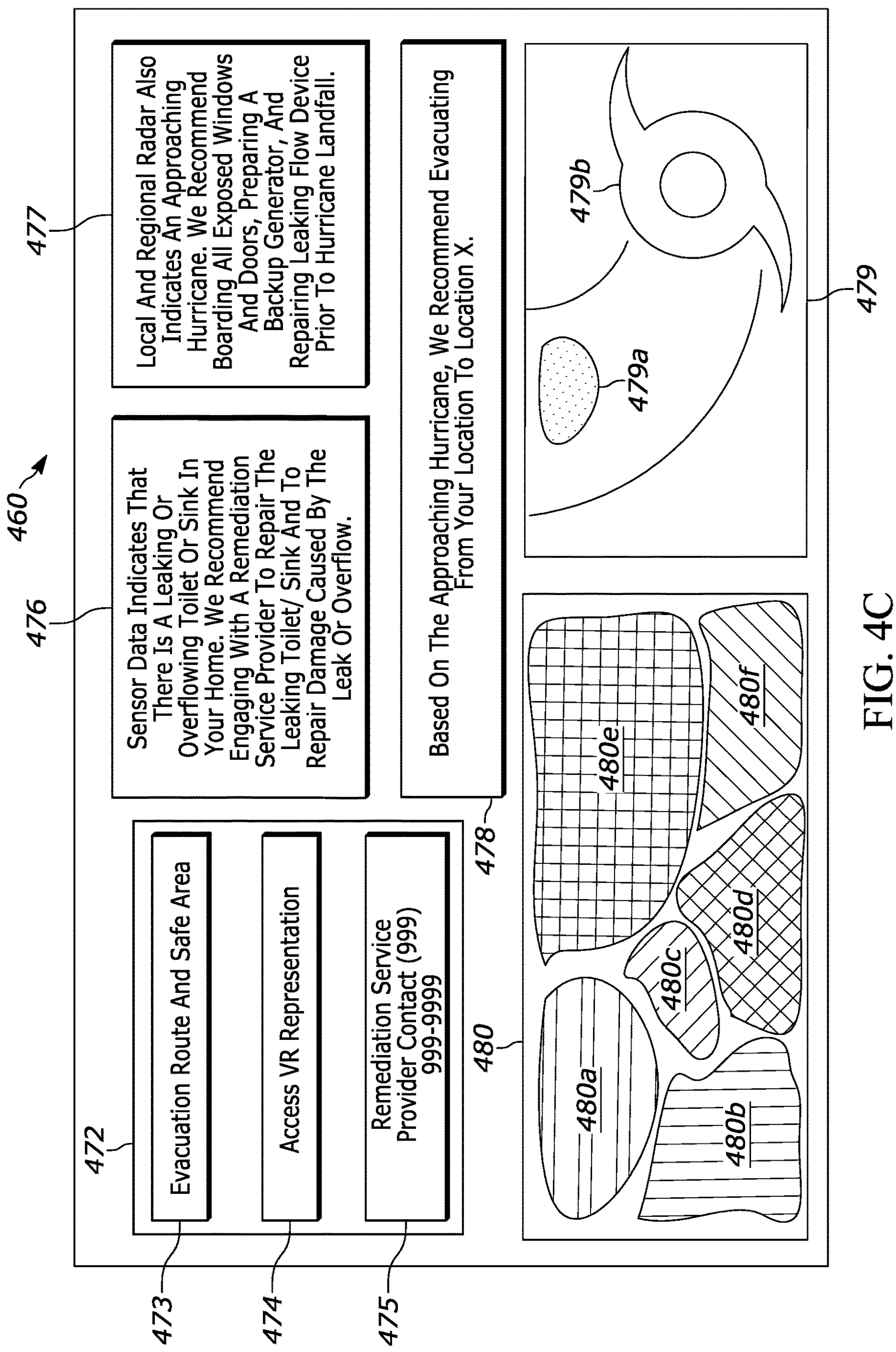
FIG. 4C depicts a third exemplary graphical user interface (GUI) that may be displayed on a user computing device of FIG. 1, in accordance with various embodiments described herein.

FIG. 4C depicts a third exemplary GUI 460 that may be displayed on a user computing device 120 of FIG. 1, in accordance with various embodiments described herein. Generally, the third exemplary GUI 460 allows a user to interact with the central server 110, which may include receiving outputs from the central server 110 or sending inputs to the central server 110 as described in reference to the third exemplary workflow 220 of FIG. 2C. The third exemplary GUI 460 thus provides the user with a designated place to remain informed regarding the functioning of a computing system configured to monitor devices and structures (e.g., exemplary computing system 100). In particular, the third exemplary GUI 460 may display information, values, maps, contact information, and/or other data related to emergency conditions corresponding to a device and/or a structure.

Namely, the third exemplary GUI 460 may include a first display hub 472, a remediation alert signal hub 476, a damage mitigation hub 477, an evacuation recommendation hub 478, a catastrophic event hub 479, and a regional catastrophic event hub 480. The first display hub 472 may include an evacuation route and safe area button 473, an interactive VR representation button 474, and remediation service provider contact information 475. The user may directly interact (e.g., click, swipe, tap, gesture, voice command, etc.) with the evacuation route and safe area button 473, the interactive VR representation button 474, and the remediation service provider contact information 475 to initiate additional actions that may direct the user away from the third exemplary GUI 460.

For example, interacting with the evacuation route and safe area button 473 may cause the user computing device 120 to render and/or otherwise display one or more proposed evacuation routes or safe areas on the display for viewing by the user. For example, the user may interact with the evacuation route and safe area button 473, and the user computing device 120 may exit and/or close the third exemplary GUI 460 and open a mapping application or other application that may display proposed evacuation routes from the user's current location or the location of the structure/device to a safe area (e.g., managed by an entity as free shelter from the catastrophic event).

Interacting with the interactive VR representation button 474 may cause the user computing device 120 to instruct the user to prepare a VR headset (not shown), and the user computing device 120 may then render and/or otherwise cause the user to view a representation of the catastrophic event and/or a representation of the user's associated structure and/or device when the catastrophic event reaches the structure and/or device. The user may view the VR environment, and the user computing device 120 may render a representation of the catastrophic event in the VR environment by replicating predicted rainfall, wind gusts, and/or other effects of the catastrophic event in the VR environment for viewing by the user. For example, the user may view the VR environment, and the user computing device 120 may cause a representation of the effects of hurricane force winds on the structure and/or the device to be displayed to the user in the VR environment. Additionally, or alternatively, the user computing device 120 may render all or a portion of the evacuation routes in the VR environment for display to the user, so that the user may determine potential traffic conditions, etc.

Additionally, interacting with the remediation service provider contact information 475 may cause the user computing device 120 to initiate a communication (e.g., phone call) between the user and the device maintenance provider (e.g., via remediation service provider computing device 140). In other words, when the user interacts with the remediation service provider contact information 475, the user computing device 120 may automatically exit and/or close the third exemplary GUI 460, and the user computing device 120 may open and/or otherwise activate a phone calling application or function, dial the number (e.g., (999) 999-999 in FIG. 4C) associated with the remediation service provider, and thereby enable the user to communicate directly with an employee or other representative of the remediation service provider. Of course, as previously mentioned, such communication initiated by the user computing device 120 may be or include, without limitation, a phone call, a web chat, an email, a text message, and/or any other suitable communication medium or combinations thereof.

Each of the remediation alert signal hub 476, the damage mitigation hub 477, and the evacuation recommendation hub 478 may provide instructions, values, recommendations, and/or other indications to a user related to data processed by the central server 110. For example, the remediation alert signal hub 476 states that "[s]ensor data indicates that there is a leaking or overflowing toilet or sink in your home. We recommend engaging with a remediation service provider to repair the leaking toilet/sink and to repair damage caused by the leak or overflow." The user may view this remediation alert signal in the remediation alert signal hub 476, and the user may check the toilet (e.g., toilet apparatus 321) and/or the sink (e.g., sink apparatus 322) for optimal operating conditions to ensure that there is no leak, and if there is one to contact a remediation service provider (e.g., via remediation service provider contact information 475) to receive remediation services corresponding to water damage from leaking devices.

As another example, and as illustrated in FIG. 4C, the damage mitigation hub 477 states that "[l]ocal and regional radar also indicates an approaching hurricane. We recommend boarding all exposed windows and doors, preparing a backup generator, and repairing leaking flow devices prior to hurricane landfall." The user may view these recommended damage mitigation actions in the damage mitigation hub 477, and the user may begin making preparations in advance of the catastrophic event (e.g., hurricane) to mitigate the potential damaging effects of the catastrophic event on the user' structure and/or devices.

As yet another example, and as illustrated in FIG. 4C, the evacuation recommendation hub 478 states that "[b]ased on the approaching hurricane, we recommend evacuating from your location to location X." The user may view this proposed evacuation recommendation in the evacuation recommendation hub 478, and the user may determine whether or not to evacuate from the location of the structure. More specifically, the user may consider evacuating to the specific location (e.g., "location X") mentioned in the evacuation recommendation hub 478, and the user may interact with the evacuation recommendation hub 478 and/or the evacuation route and safe area button 473 to receive recommended evacuation routes and/or safe areas where the user may desire to evacuate to avoid damaging effects from the catastrophic event.

The catastrophic event hub 479 may generally indicate a large-scale view of an approaching and/or otherwise proximate catastrophic event relative to a structure/device. In particular, the catastrophic event hub 479 includes a region 479*a* that is predicted to be within the path of a catastrophic event 479*b* (e.g., a hurricane). From this catastrophic event hub 479, the user may view updates to path information of the catastrophic event 479*b*, and may continue to monitor the progress of the catastrophic event 479*b* as it approaches and/or otherwise moves relative to the user's region 479*a*.

The regional catastrophic event hub 480 may generally represent predicted effects of a catastrophic event 479*b* on structure and/or devices in the various regions 480*a-f*, at least one of which, may include the structure corresponding to the user accessing the third exemplary GUI 460. The area represented in the regional catastrophic event hub 480 may generally correspond to the region 479*a* from the catastrophic event hub 479, but the area may also include more or fewer landmass or other areas than the region 479*a*. The central server 110 may have aggregated sensor data from a plurality of sensors disposed proximate to a plurality of structures or devices, as discussed in reference to at least FIG. 3B, and the central server 110 may generate the catastrophic event map displayed in the regional catastrophic event hub 480.

For example, the catastrophic event map displayed in the regional catastrophic event hub 480 may include a plurality of regions 480*a-f* that may each have a different corresponding level/value, such as an emergency condition likelihood value based upon estimated/predicted damaging effects from the catastrophic event. The first region 480*a* may have a level/value that is relatively low, the second region 480*b* may have a level/value that is relatively average, the third region 480*c* may have a level/value that is relatively high, the fourth region 480*d* may have a level/value that is relatively high, the fifth region 480*e* may have a level/value that is relatively average, and the sixth region 480*f* may have a level/value that is relatively low.

Of course, it should be understood that the levels/values in the various regions 480*a-f* may be any suitable value, such as the emergency condition likelihood value, an evacuation likelihood value, an overall cost value from damage of the catastrophic event, an average evacuation distance value, and/or any other suitable value(s) or combinations thereof. Further, the catastrophic event map displayed in the regional catastrophic event hub 480 may include any suitable number of regions 480*a-f* that have any suitable shapes.

Moreover, it should be understood that any sensor data, user data, environmental data, contractor data, geolocation data, and/or any values determined, detected, calculated, and/or otherwise output by the central server 110 may be displayed generally in any of the GUIs 400, 430, 460. Additionally, or alternatively, it should be appreciated that interaction with any of the hubs or other displays in the GUIs 400, 430, 460 may cause the user computing device 120 and/or the central server 110 to perform other actions than those described in reference to FIGS. 4A-4C. For example, a user interacting with the remediation alert signal hub 476 of FIG. 4C may cause the user computing device 120 to transmit a signal to a device configured to close a water supply valve in the structure to alleviate or mitigate damage resulting from the leaking toilet or sink. Of course, this example is for illustration purposes only, and other actions/signals described herein may be transmitted, relayed, and/or otherwise performed by the user computing device 120 and/or the central server 110 in response to the user interacting with any hub or display within the GUIs 400, 430, 460.

Exemplary Virtual Representations of Structures and Devices

Figure 5:
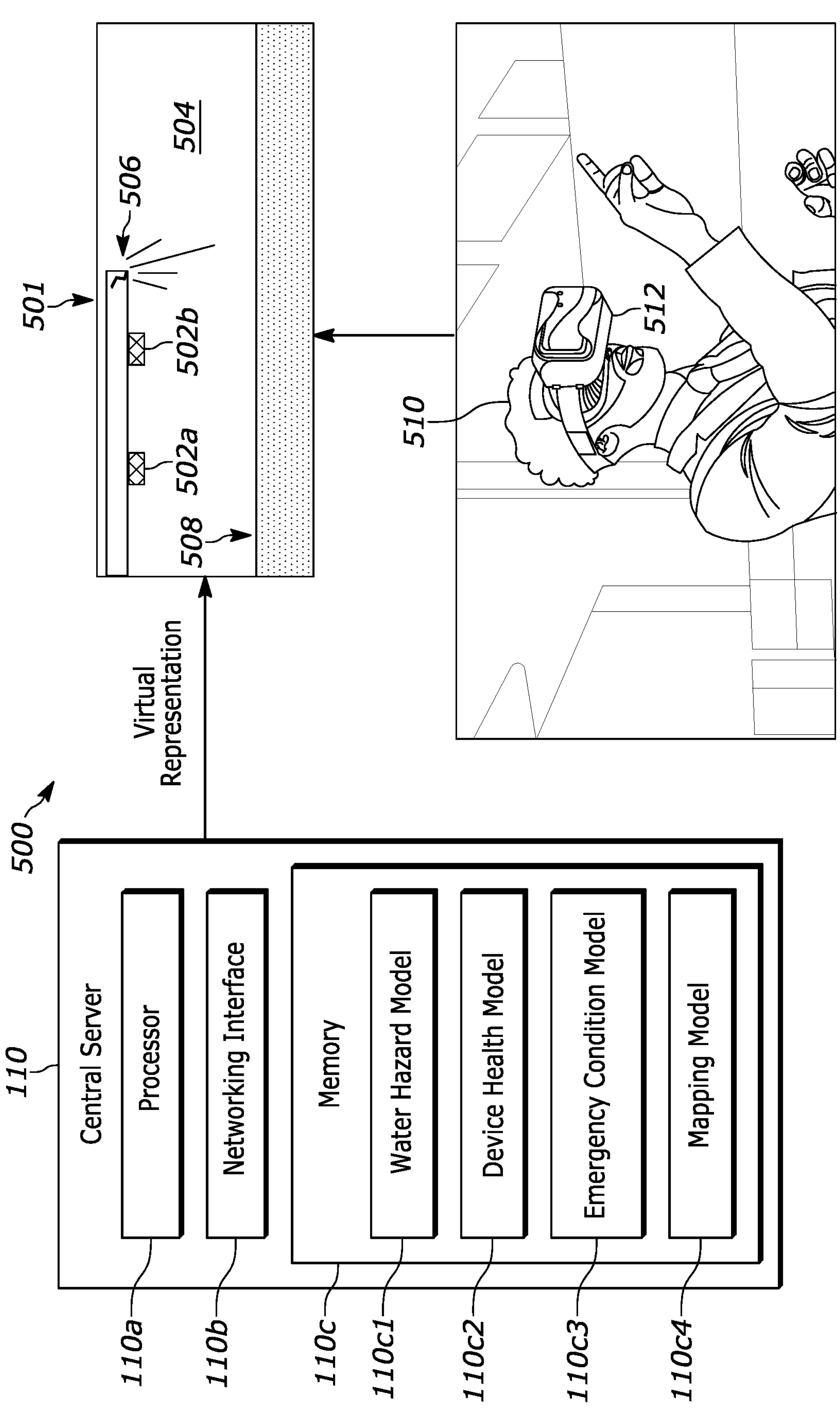
FIG. 5 depicts an exemplary generation of a virtual representation of a condition, such as a water hazard condition, for viewing by a user in a virtual environment, and in accordance with various embodiments described herein.

As previously mentioned, a user may view virtual representations of various structures, devices, and/or alerts, recommendations, and/or other calculated values determined by the central server 110. FIG. 5 depicts an exemplary generation and viewing sequence 500 of a virtual representation of a condition, such as a water hazard condition, for viewing by a user 510 in a virtual environment 501, and in accordance with various embodiments described herein. In particular, the virtual representation may be a virtual reality (VR) representation (e.g., a virtual, 3D model) of a basement 504 of a user's structure. However, it should be understood that the virtual representation may be a virtual, 3D model of the user's structure and/or any portion thereof, and/or any devices corresponding to the structure.

In particular, FIG. 5 depicts the central server 110 generating the virtual representation that is displayed in the virtual environment 501. The central server 110 may generate the virtual representation by utilizing any of water level signal data, usage data, sensor data, radar data, historical water level data, contractor data, geolocation data, 3D scan data, and/or other suitable data to generate the VR representation of the basement 504. For example, the central server 110 may utilize sensor data from one or more sensors disposed in the real basement of the user's structure to generate an approximate replication of the basement 504 in the virtual environment 501. The central server 110 may also utilize water level signal data, a detected emergency condition, and/or other suitable data or values to replicate an emergency condition within the basement 504 of the user's structure in the virtual environment 501.

As illustrated in FIG. 5, the user 510 may utilize a VR headset 512 to view the virtual environment 501, which may be hosted as part of a VR platform, such as the Metaverse. In the exemplary generation and viewing sequence 500, the user 510 may have recently received an alert signal indicating that a water pipe in the actual basement of their structure has cracked or burst and is leaking water into the basement floor. The user 510 may then interact with an option or button (e.g., interactive VR representation button 415) configured to enable the user to view the virtual environment 501, and as a result, the user 510 may view the virtual environment 501 through the VR headset 512. A VR platform (e.g., Metaverse) hosting server (not shown) and/or other suitable device may receive the virtual representation from the central server 110, and may proceed to render the virtual representation within the virtual environment 501. The user 510 may have a virtual model of the user's structure stored in the VR platform, and the virtual model may include a virtual representation of the basement 504, such that the VR platform may update the virtual representation of the basement 504 with the virtual representation provided by the central server 110.

Additionally, or alternatively, the VR platform hosting server and/or other suitable device may receive any of water level signal data, usage data, sensor data, radar data, historical water level data, contractor data, geolocation data, 3D scan data, and/or other suitable data, and may interpret the received data to determine if or how to update the user's virtual representation of the basement 504 based upon the received data. For example, and as illustrated in FIG. 5, the VR platform hosting server may determine that the water supply pipe in the basement 504 has a cracked end, and may update the virtual representation of the basement 504 by including a damage representation 506 on or near the end of the water supply pipe in the virtual representation of the basement 504. In this manner, the user 510 may access the VR platform through the VR headset 512, and may view the damage representation 506 on the virtual representation of the basement 504. As part of this virtual environment 501, the VR platform and/or the central server 110 may render one or more sensors 502*a*, 502*b* and a water level 508 in the virtual representation of the basement 504 so that the user 510 may visualize where the data originated from, and an approximation of the emergency condition in the actual basement.

If the user contacts a remediation service provider, the virtual representation of the basement 504 may update/change to reflect the remediation services. Namely, as the remediation progresses, the remediation provider may input/upload remediation data into the central server 110 that indicates an updated/repaired state of the cracked end of the water supply pipe and a reduced water level on the actual basement floor. The VR platform hosting server and/or other suitable device may access the central server 110 by, for example, providing authorizing credentials corresponding to the user 510, and may retrieve the remediation data corresponding to the completed maintenance of the water supply valve and basement water level.

The VR platform hosting server and/or other suitable device may thereby retrieve the remediation data from the central server 110 and/or a remediation service provider computing device 140, and may interpret the remediation data to determine if or how to update the virtual representation of the basement 504 based upon the remediation data. For example, the VR platform hosting server may determine that the cracked end of the water supply pipe is repaired and the basement water level is reduced based upon the remediation data, and may update the virtual representation of the basement 504 by including a repaired portion (not shown) as part of the virtual representation of the basement 504 that was previously occupied by the damage representation 506. Similarly, the VR platform hosting server may remove the water level 508 from the virtual representation of the basement 504 to indicate that the water level in the actual basement has been reduced. Therefore, the user 510 may access the VR platform through the VR headset 512, and may view the repaired/updated portions as part of the virtual representation of the basement 504 when the remediation is completed and the remediation data is stored/uploaded to the central server 110 and/or the remediation service provider computing device 140, thereby documenting the completed remediation.

Of course, the virtual environment 501 represented in FIG. 5 is a single embodiment that is for the purposes of discussion only. As such, it should be appreciated that the virtual environment may be or include a VR representation of any suitable portion of the user's structure, a device associated with the structure, and/or any other data or values measured, calculated, and/or otherwise generated in relation to the structure.

Exemplary Methods

Figure 6A:
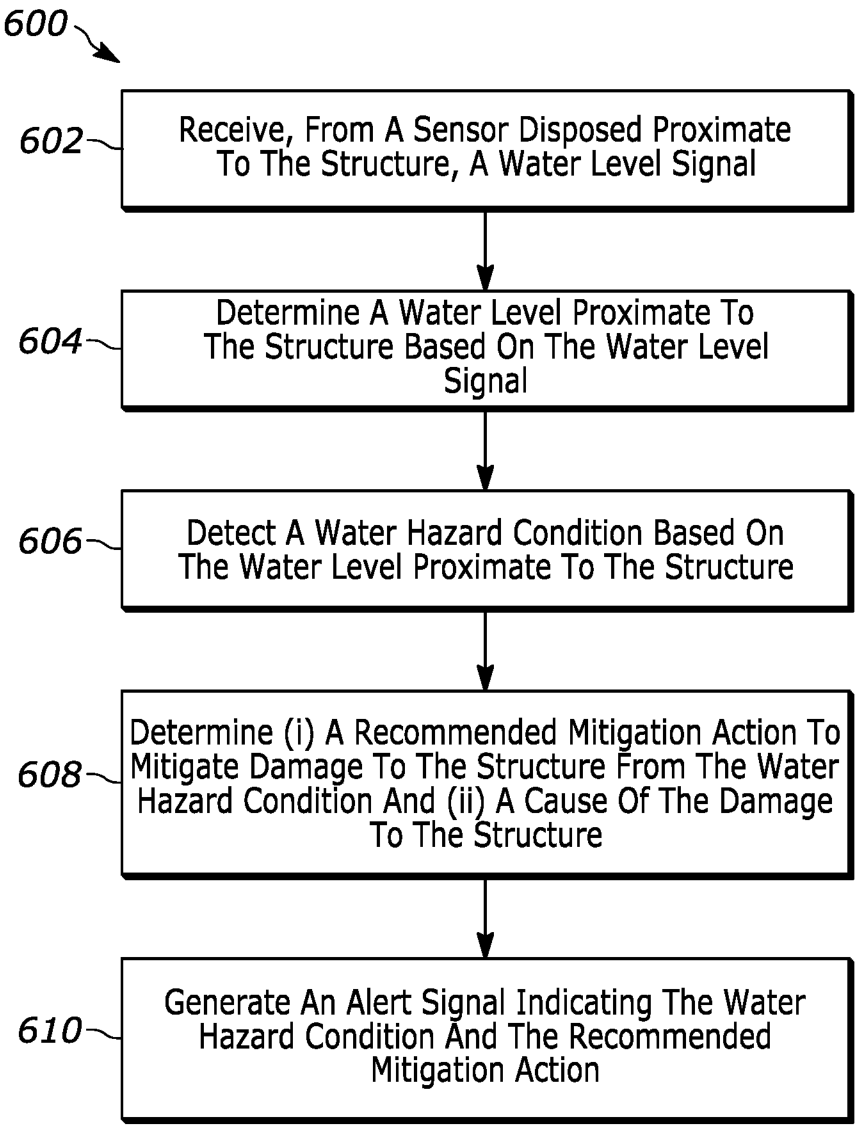
FIG. 6A depicts a first flow diagram representing an exemplary computer-implemented method, in accordance with various embodiments described herein.

FIG. 6A depicts a first flow diagram 600 representing an exemplary computer-implemented method, in accordance with various embodiments described herein. The method may be implemented by one or more processors of the exemplary computing system 100, such as the central server 110, the workstation 111, the user computing device 120, the sensor device 130, the remediation service provider computing device 140, the external server 150, and/or any other suitable components described herein or combinations thereof.

The method may include receiving, from a sensor disposed proximate to the structure, a water level signal (block 602). The method also may include determining, by one or more processors, a water level proximate to the structure based upon the water level signal (block 604). The method further may include detecting, by the one or more processors executing a water hazard model, a water hazard condition based upon the water level proximate to the structure (block 606).

Moreover, the method may include determining, by the one or more processors, (i) a recommended mitigation action to mitigate damage to the structure from the water hazard condition and (ii) a cause of the water hazard condition (block 608). The method may also include generating, by the one or more processors, an alert signal indicating the water hazard condition and the recommended mitigation action (block 610).

In some embodiments, the sensor may be one of a plurality of sensors disposed proximate to a plurality of structures, and receiving the water level signal may further comprise: aggregating, by the one or more processors, water level signals from the plurality of sensors; creating, by the one or more processors, a regional water level map that represents water level conditions in a region including the structure; and causing, by the one or more processors, the regional water level map to be displayed to a user. Further in these embodiments, the method may further include: retrieving, by the one or more processors, radar data representing weather conditions within the region including the structure; determining, by the one or more processors, a predicted water level at a first time based upon the radar data and the water level signals from the plurality of sensors; and/or generating, by the one or more processors, a predicted alert signal indicating (i) the predicted water level at the first time and (ii) a predicted mitigation action.

In certain embodiments, the method may further include: retrieving , by the one or more processors, historical water level data for a plurality of regions including the region that includes the structure, the historical water level data including at least one of: (i) water level values, (ii) ground saturation values, (iii) water damage claim values, or (iv) soil-type values; determining, by the one or more processors, one or more zones within the plurality of regions based upon the historical water level data; and causing, by the one or more processors, the one or more zones to be displayed to a user. Further in these embodiments, determining the cause of the damage to the structure may further include: retrieving, by the one or more processors, contractor data corresponding to structures within the plurality of regions; and/or determining, by the one or more processors, the cause of the damage to the structure based upon the contractor data and the historical water level data.

In some embodiments, the method may further include: retrieving, by the one or more processors, geolocation data corresponding to the structure; determining, by the one or more processors, a structural recommendation based upon the geolocation data and the water hazard condition; and/or causing, by the one or more processors, the structural recommendation to be displayed to a user. Further in these embodiments, the sensor disposed proximate to the structure may be configured to generate a three-dimensional (3D) scan of ground proximate to the structure, and the method further may include: receiving, from the sensor, the 3D scan of the ground proximate to the structure; identifying, by the one or more processors, ground slopes of the ground proximate to the structure; and/or determining, by the one or more processors, a recommended modification to the ground proximate to the structure based upon the ground slopes and the water hazard condition. Still further in these embodiments, the sensor may be disposed in an unmanned aerial vehicle (UAV) configured to fly over the structure.

In certain embodiments, the method may further include: generating, by the one or more processors, a virtual reality (VR) representation of ground proximate to the structure; and causing, by the one or more processors, one or more recommendations to be displayed to a user in the VR representation.

Figure 6B:
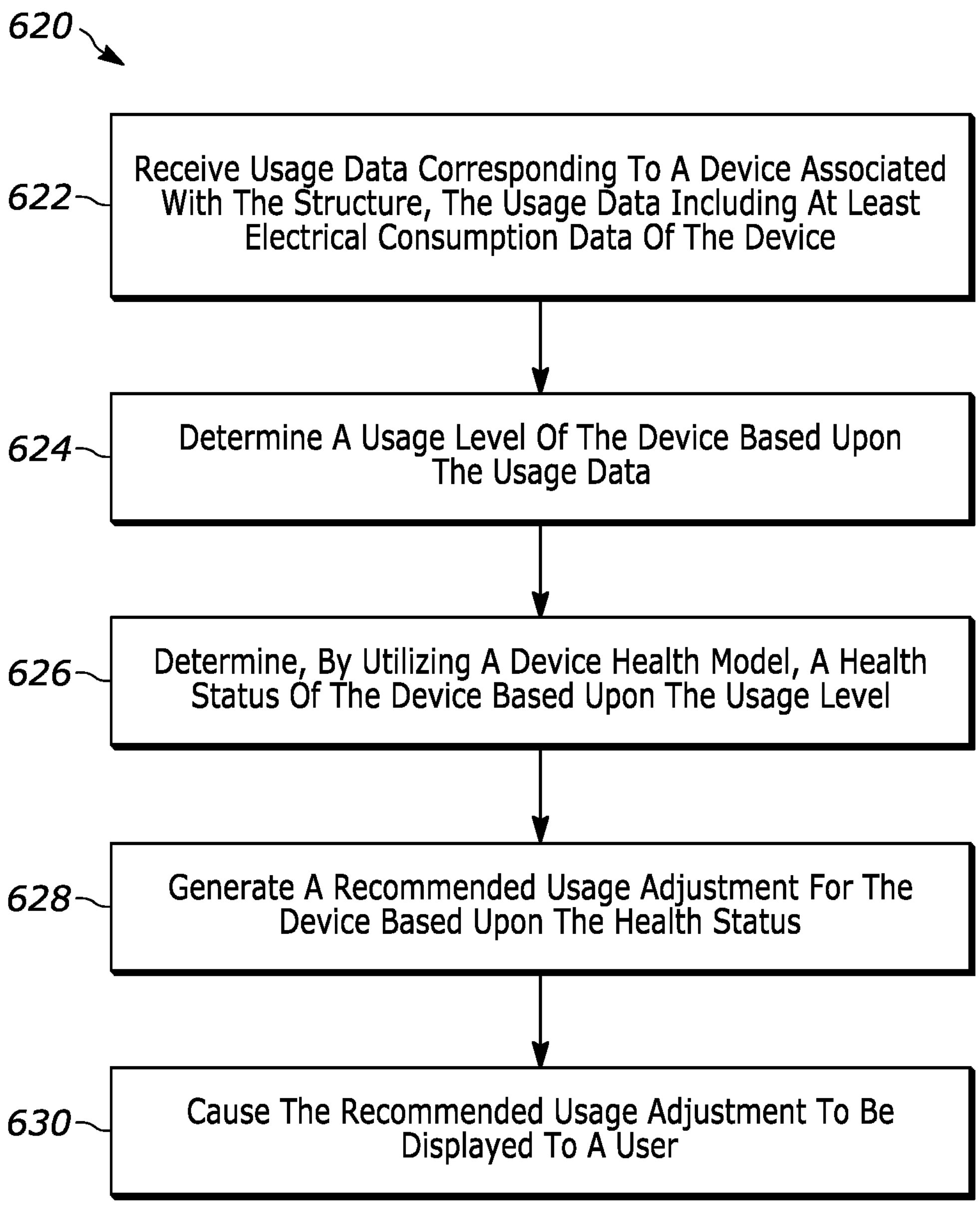
FIG. 6B depicts a second flow diagram representing an exemplary computer-implemented method, in accordance with various embodiments described herein.

FIG. 6B depicts a second flow diagram 620 representing an exemplary computer-implemented method, in accordance with various embodiments described herein. The method may be implemented by one or more processors of the exemplary computing system 100, such as the central server 110, the workstation 111, the user computing device 120, the sensor device 130, the remediation service provider computing device 140, the external server 150, and/or any other suitable components described herein or combinations thereof.

The method may include receiving, at one or more processors, usage data corresponding to a device associated with the structure (block 622). The usage data may include at least electrical consumption data of the device. The method may further include determining, by the one or more processors, a usage level of the device based upon the usage data (block 624). The method may also include determining, by the one or more processors utilizing a device health model, a health status of the device based upon the usage level (block 626).

Further, the method may include generating, by the one or more processors, a recommended usage adjustment for the device based upon the health status (block 628). The method may also include causing, by the one or more processors, the recommended usage adjustment to be displayed to a user (block 630).

In certain embodiments determining the usage level of the device may further comprise: determining, by the one or more processors, a current draw level of the device while the device is in operation based upon the electrical consumption data of the device; comparing, by the one or more processors, the current draw level of the device with a threshold current draw level; responsive to determining that the current draw level exceeds the threshold current draw level, generating, by the one or more processors, an alert signal indicating that the current draw level exceeds the threshold current draw level; and/or causing, by the one or more processors, the recommended usage adjustment and the alert signal to be displayed to the user.

In some embodiments, the method may further include: determining, by the one or more processors, a health difference value between the health status of the device and a prior health status of the device; comparing, by the one or more processors, the health difference value to a threshold health difference value; responsive to determining that the health difference value exceeds the threshold health difference value, determining, by the one or more processors, a cause of the health difference value; and/or causing, by the one or more processors, the recommended usage adjustment and the cause of the health difference value to be displayed to the user.

In certain embodiments, receiving the usage data may further include: aggregating, by the one or more processors, usage data from a plurality of devices in a plurality of structures within a region including the structure; creating, by the one or more processors, a regional usage map that represents the usage data in the region; and/or causing, by the one or more processors, the regional usage map to be displayed to the user. Further in these embodiments, the method may further include: determining, by the one or more processors, an estimated maintenance value corresponding to the device based upon the usage data from the plurality of devices.

In some embodiments, the recommended usage adjustment may include at least one of: (i) a device setting recommendation, (ii) a replacement device recommendation, (iii) a structure adjustment recommendation, and/or (iv) a location recommendation.

In certain embodiments, the method further include: retrieving, by the one or more processors, historical usage data for a plurality of devices in a plurality of regions including a region that includes the structure, the historical usage data including at least electrical consumption data for the plurality of devices; determining, by the one or more processors, one or more zones within the plurality of regions based upon the historical usage data; and/or causing, by the one or more processors, the one or more zones to be displayed to the user. Further in these embodiments, the method may further include: generating, by the one or more processors, the recommended usage adjustment for the device based upon the health status and the historical usage data of a zone that includes the structure.

In some embodiments, the device associated with the structure may be at least one of a sump pump or a water heater. Additionally, in certain embodiments, the method may further include: generating, by the one or more processors, a proposed policy term adjustment corresponding to the structure based on the health status of the device; and/or causing, by the one or more processors, the proposed policy term adjustment to be displayed to the user.

Figure 6C:
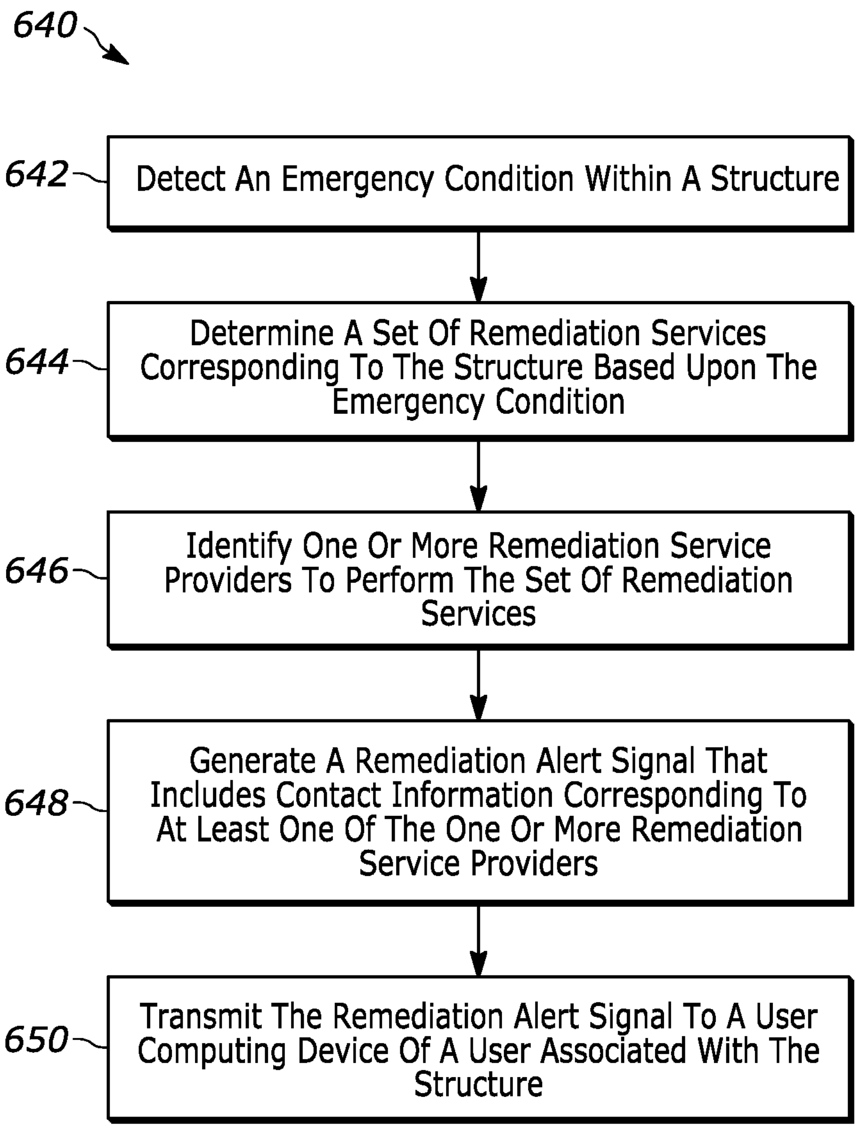
FIG. 6C depicts a third flow diagram representing an exemplary computer-implemented method, in accordance with various embodiments described herein.

FIG. 6C depicts a third flow diagram 640 representing an exemplary computer-implemented method, in accordance with various embodiments described herein. The method may be implemented by one or more processors of the exemplary computing system 100, such as the central server 110, the workstation 111, the user computing device 120, the sensor device 130, the remediation service provider computing device 140, the external server 150, and/or any other suitable components described herein or combinations thereof.

The method may include detecting, by one or more processors, an emergency condition within a structure (block 642). The method may further include determining, by the one or more processors, a set of remediation services corresponding to the structure based upon the emergency condition (block 644). The method may also include identifying, by the one or more processors, one or more remediation service providers to perform the set of remediation services (block 646).

Further, the method may include generating, by the one or more processors, a remediation alert signal that includes contact information corresponding to at least one of the one or more remediation service providers (block 648). The method may also include transmitting, by the one or more processors, the remediation alert signal to a user computing device of a user associated with the structure (block 650).

In certain embodiments, the method may further include: prior to detecting the emergency condition, detecting, by the one or more processors, a catastrophic event approaching the structure; generating, by the one or more processors, a damage mitigation recommendation based upon the catastrophic event and the structure; and/or transmitting, by the one or more processors, the damage mitigation recommendation to the user computing device. Further in these embodiment, the method may further include: responsive to detecting the catastrophic event, determining, by the one or more processors, whether or not the structure is occupied based upon signal data from one or more devices associated with the structure; and/or responsive to determining that the structure is not occupied, transmitting, by the one or more processors, a signal to a device within the structure to perform a preventative action corresponding to the catastrophic event. Still further in these embodiments, the one or more devices associated with the structure may include at least one of: (i) a smart lock, (ii) a home security system, or (iii) a water flow sensor.

In some embodiments, determining the set of remediation services may further include: determining, by the one or more processors, a remediation action based upon the emergency condition, the remediation action being associated with a device within the structure; and/or transmitting, by the one or more processors, a signal to the device to perform the remediation action.

In certain embodiments, the method may further include: prior to detecting the emergency condition, detecting, by the one or more processors, a catastrophic event approaching the structure; aggregating, by the one or more processors, signal data from a plurality of devices in a plurality of structures within a region including the structure; determining, by the one or more processors, an evacuation value associated with the region based upon the signal data from the plurality of devices; generating, by the one or more processors, an evacuation recommendation based upon the evacuation value; and/or causing, by the one or more processors, the evacuation recommendation to be displayed to the user. Further in these embodiments, the evacuation recommendation includes one or more recommended evacuation routes and one or more safe areas.

In some embodiments, the method may further include: prior to detecting the emergency condition, detecting, by the one or more processors, a catastrophic event approaching the structure; determining, by the one or more processors, an emergency condition likelihood value based upon the catastrophic event; generating, by the one or more processors, an emergency condition alert based upon the emergency condition likelihood value; and/or causing, by the one or more processors, the emergency condition alert to be displayed to the user.

In certain embodiments, the method may further include: generating, by the one or more processors, a virtual representation of the emergency condition within a virtual reality (VR) environment; and/or causing, by the one or more processors, the virtual representation of the emergency condition to be displayed to the user while the user is viewing the VR environment.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for detecting water hazard conditions proximate to a structure to improve structure survivability, the method comprising:

receiving, from a sensor disposed proximate to the structure that is one of a plurality of sensors disposed proximate to a plurality of structures, a water level signal;

aggregating, by one or more processors, water level signals from the plurality of sensors;

determining, by the one or more processors, a water level proximate to the structure based upon the water level signal;

detecting, by the one or more processors executing a water hazard model, a water hazard condition based upon the water level proximate to the structure;

determining, by the one or more processors, (i) a recommended mitigation action to mitigate damage to the structure from the water hazard condition, (ii) a cause of the water hazard condition, and (iii) a predicted water level at a first time based upon the water level signals from the plurality of sensors; and generating, by the one or more processors, an alert signal indicating the water hazard condition, the recommended mitigation action, and the predicted water level at the first time.

2. The computer-implemented method of claim 1, further comprising:

retrieving, by the one or more processors, radar data representing weather conditions within a region including the structure;

creating, by the one or more processors, a regional water level map that represents water level conditions in the region including the structure; and causing, by the one or more processors, the regional water level map to be displayed to a user.

3. The computer-implemented method of claim 1, further comprising:

retrieving, by the one or more processors, historical water level data for a plurality of regions including a region that includes the structure, the historical water level data including at least one of: (i) water level values, (ii) ground saturation values, (iii) water damage claim values, or (iv) soil-type values;

determining, by the one or more processors, one or more zones within the plurality of regions based upon the historical water level data; and causing, by the one or more processors, the one or more zones to be displayed to a user.

4. The computer-implemented method of claim 3, wherein determining the cause of the damage to the structure further comprises:

retrieving, by the one or more processors, contractor data corresponding to structures within the plurality of regions; and determining, by the one or more processors, the cause of the damage to the structure based upon the contractor data and the historical water level data.

5. The computer-implemented method of claim 1, further comprising:

retrieving, by the one or more processors, geolocation data corresponding to the structure;

determining, by the one or more processors, a structural recommendation based upon the geolocation data and the water hazard condition; and causing, by the one or more processors, the structural recommendation to be displayed to a user.

6. The computer-implemented method of claim 5, wherein the sensor disposed proximate to the structure is configured to generate a three-dimensional (3D) scan of ground proximate to the structure, and the method further comprises:

receiving, from the sensor, the 3D scan of the ground proximate to the structure;

identifying, by the one or more processors, ground slopes of the ground proximate to the structure; and determining, by the one or more processors, a recommended modification to the ground proximate to the structure based upon the ground slopes and the water hazard condition.

7. The computer-implemented method of claim 6, wherein the sensor is disposed in an unmanned aerial vehicle (UAV) configured to fly over the structure.

8. The computer-implemented method of claim 1, further comprising:

generating, by the one or more processors, a virtual reality (VR) representation of ground proximate to the structure; and causing, by the one or more processors, one or more recommendations to be displayed to a user in the VR representation.

9. The computer-implemented method of claim 1, further comprising:

responsive to detecting the water hazard condition, determining, by the one or more processors, whether the structure is occupied based upon signal data from one or more devices associated with the structure, wherein the one or more devices associated with the structure include at least one of: (i) a smart lock, (ii) a home security system, or (iii) a water flow sensor; and responsive to determining that the structure is not occupied, transmitting, by the one or more processors, a signal to a device within the structure to perform a preventative action corresponding to the water hazard condition.

10. The computer-implemented method of claim 1, further comprising:

determining, by the one or more processors, a remediation action based upon the water hazard condition, the remediation action being associated with a device disposed within the structure; and transmitting, by the one or more processors, a signal to the device to cause the device to perform the remediation action.

11. A system for detecting water hazard conditions proximate to a structure to improve structure survivability, comprising:

one or more processors; and a non-transitory computer-readable memory coupled to the one or more processors, the memory storing instructions thereon that, when executed by the one or more processors, cause the one or more processors to:

receive, from a sensor disposed proximate to the structure that is one of a plurality of sensors disposed proximate to a plurality of structures, a water level signal, aggregate water level signals from the plurality of sensors, determine a water level proximate to the structure based upon the water level signal, detect, by executing a water hazard model, a water hazard condition based upon the water level proximate to the structure, determine (i) a recommended mitigation action to mitigate damage to the structure from the water hazard condition, (ii) a cause of the water hazard condition, and (iii) a predicted water level at a first time based upon the water level signals from the plurality of sensors, and generate an alert signal indicating the water hazard condition, the recommended mitigation action, and the predicted water level at the first time.

12. The system of claim 11, wherein the instructions, when executed, further cause the one or more processors to:

retrieve radar data representing weather conditions within a region including the structure;

create a regional water level map that represents water level conditions in the region including the structure; and cause the regional water level map to be displayed to a user.

13. The system of claim 11, wherein the instructions, when executed, further cause the one or more processors to:

retrieve historical water level data for a plurality of regions including a region that includes the structure, the historical water level data including at least one of: (i) water level values, (ii) ground saturation values, (iii) water damage claim values, or (iv) soil-type values;

determine one or more zones within the plurality of regions based upon the historical water level data; and cause the one or more zones to be displayed to a user.

14. The system of claim 13, wherein the instructions, when executed, further cause the one or more processors to determine the cause of the damage to the structure by:

retrieving contractor data corresponding to structures within the plurality of regions; and determining the cause of the damage to the structure based upon the contractor data and the historical water level data.

15. The system of claim 11, wherein the instructions, when executed, further cause the one or more processors to:

retrieve geolocation data corresponding to the structure;

determine a structural recommendation based upon the geolocation data and the water hazard condition; and cause the structural recommendation to be displayed to a user.

16. The system of claim 15, wherein the sensor disposed proximate to the structure is configured to generate a three-dimensional (3D) scan of ground proximate to the structure, and the instructions, when executed, further cause the one or more processors to:

receive, from the sensor, the 3D scan of the ground proximate to the structure;

identify ground slopes of the ground proximate to the structure; and determine a recommended modification to the ground proximate to the structure based upon the ground slopes and the water hazard condition.

17. The system of claim 11, wherein the instructions, when executed, further cause the one or more processors to:

responsive to detecting the water hazard condition, determine whether the structure is occupied based upon signal data from one or more devices associated with the structure, wherein the one or more devices associated with the structure include at least one of: (i) a smart lock, (ii) a home security system, or (iii) a water flow sensor; and responsive to determining that the structure is not occupied, transmit a signal to a device within the structure to perform a preventative action corresponding to the water hazard condition.

18. A tangible machine-readable medium comprising instructions for detecting water hazard conditions proximate to a structure to improve structure survivability that, when executed, cause a machine to at least:

receive, from a sensor disposed proximate to the structure that is one of a plurality of sensors disposed proximate to a plurality of structures, a water level signal;

aggregate water level signals from the plurality of sensors;

determine a water level proximate to the structure based upon the water level signal;

detect, by executing a water hazard model, a water hazard condition based upon the water level proximate to the structure;

determine (i) a recommended mitigation action to mitigate damage to the structure from the water hazard condition, (ii) a cause of the water hazard condition, and (iii) a predicted water level at a first time based upon the water level signals from the plurality of sensors; and generate an alert signal indicating the water hazard condition, the recommended mitigation action, and the predicted water level at the first time.

19. The tangible machine-readable medium of claim 18, wherein the instructions, when executed, further cause the machine to at least:

retrieve radar data representing weather conditions within a region including the structure;

create a regional water level map that represents water level conditions in the region including the structure; and cause the regional water level map to be displayed to a user.

20. The tangible machine-readable medium of claim 18, wherein the instructions, when executed, further cause the machine to at least:

retrieve historical water level data for a plurality of regions including a region that includes the structure, the historical water level data including at least one of: (i) water level values, (ii) ground saturation values, (iii) water damage claim values, or (iv) soil-type values;

determine one or more zones within the plurality of regions based upon the historical water level data; and cause the one or more zones to be displayed to a user.

* * * * *